United States Patent [19]

Suzuki

[11] Patent Number: 4,517,596
[45] Date of Patent: May 14, 1985

[54] SYSTEM COMPRISING A PRELIMINARY PROCESSING DEVICE CONTROLLED IN ACCORDANCE WITH AN AMOUNT OF INFORMATION STORED IN A BUFFER

[75] Inventor: Norio Suzuki, Tokyo, Japan

[73] Assignee: Nippon Electric Co., Ltd., Tokyo, Japan

[21] Appl. No.: 428,501

[22] Filed: Sep. 29, 1982

[30] Foreign Application Priority Data

Sep. 29, 1981 [JP] Japan .................. 56-153019
Sep. 30, 1981 [JP] Japan .................. 56-155725
Oct. 9, 1981 [JP] Japan .................. 56-160341

[51] Int. Cl.$^3$ ............................. H04N 7/13
[52] U.S. Cl. .................. 358/133; 358/12; 358/13; 358/138; 375/31; 375/33
[58] Field of Search ............ 358/133, 138, 12, 13; 375/31, 33

[56] References Cited

U.S. PATENT DOCUMENTS 4,125,861 11/1978 Mounts .................. 358/133
4,133,006 1/1979 Iinuma .................. 358/133
4,255,763 3/1981 Maxemchuk .................. 358/138

*Primary Examiner*—Howard W. Britton
*Attorney, Agent, or Firm*—Sughrue, Mion, Zinn, Macpeak & Seas

[57] ABSTRACT

In an encoding system comprising a buffer circuit for successively storing variable length codes and for producing the stored codes at a predetermined rate as transmission codes, a controller produces a control signal which stepwise specifies a variable amount of the stored codes. Responsive to the control signal, a preliminary processing circuit preliminarily processes the digital video signals into preliminarily processed signals which are dependent on the amounts and which are predictively encoded in accordance with an encoding rule by a non-recursive predictive encoder into predictive error signals with information of the preliminarily processed signals preserved. For use in the buffer circuit, a variable length encoder controlled by the control signal further encodes the predictive error signals into the variable length codes of code lengths related to the amounts. The processing circuit may comprise at least one of a quantizer, a thinning circuit, and a band compression circuit. A decoding system decodes the transmission codes in accordance with a decoding rule reversible to the encoding rule to produce reproductions of the preliminarily processed signals. A combination of the encoding and the decoding systems is connected in cascade to at least one of an additional combination of the encoding and the decoding systems to repeatedly edit and/or dub video signals in a digital form. The encoding system may additionally comprise an additional predictive encoder operable, when the amount is large to compensate for that visibly perceptible degradation of picture qualities which would otherwise result from a reduction in the numbers of bits representative of the predictive error signals produced by the non-recursive predictive encoder.

15 Claims, 33 Drawing Figures (a)
L-3 — — — o o o o o o o — — — —
L-2 — — — — o o o o o o o — — —
L-1 — — — o o o o o o o — — — —
L — — — — o o o o o o o — — —

(b)
L-3 — — — o o o o o o o — — — —
L-2 — — — — x o o x o o x — — —
L-1 — — — o o o o o o o — — —
L — — — — o x o o x o o — — —

(c)
L-3 — — — x o o x o o x — — — —
L-2 — — — — x o o x o o x — — —
                                 ee
L-1 — — — o x o o x o o — — — —
                      bb      cc dd
L — — — — o x o o x o o — — —
                    aa xx

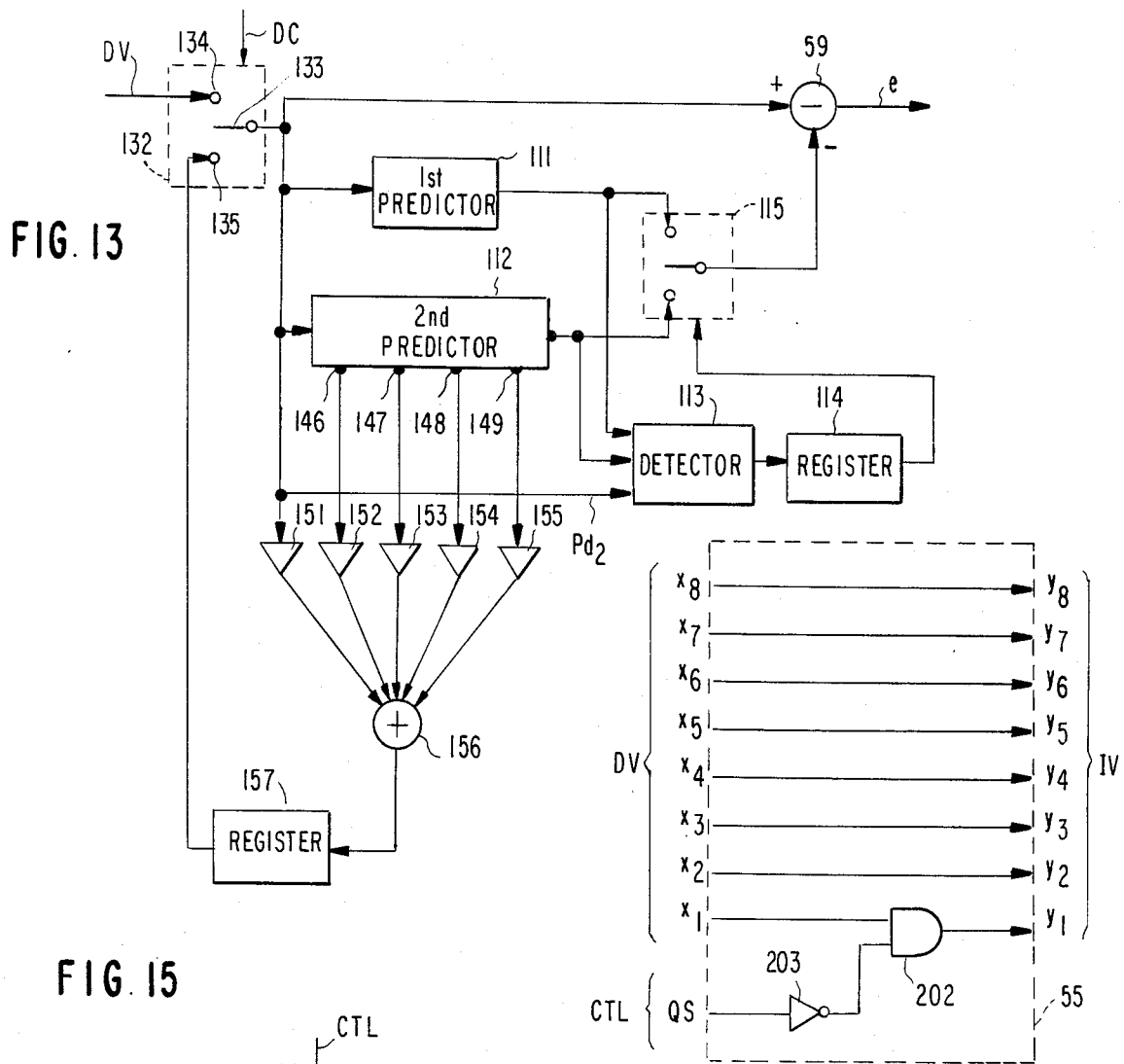
FIG. 13
FIG. 15
FIG. 17
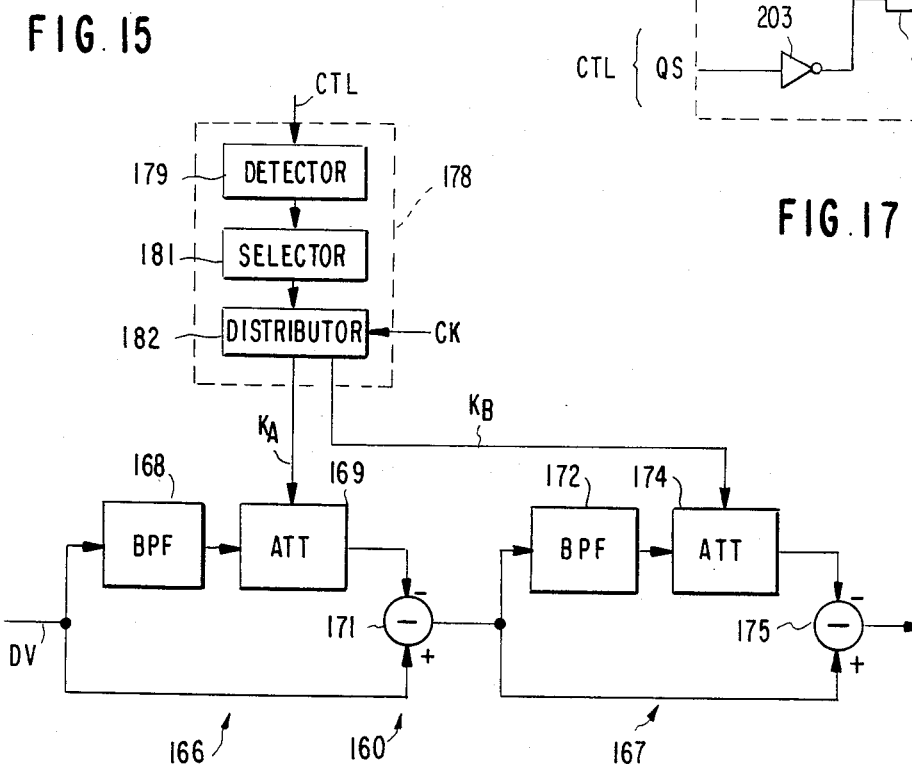

SYSTEM COMPRISING A PRELIMINARY PROCESSING DEVICE CONTROLLED IN ACCORDANCE WITH AN AMOUNT OF INFORMATION STORED IN A BUFFER

BACKGROUND OF THE INVENTION

This invention relates to a predictive code communication system for use on transmitting video signals, such as television signals or the like.

In a conventional predictive code communication system, a predictive encoder of a recursive type is used to carry out differential pulse code modulation (DPCM). Such a predictive encoder, which is characterized by a feedback loop, comprises a subtractor for subtracting predictive signals from input digital video signals to produce error signals and a quantizer for nonuniformly quantizing the error signals to produce quantized error signals as output digital video signals, as is well known in the art.

The DPCM is effective to reduce or compress an amount of information to be transmitted as the output digital video signals. This is because the DPCM efficiently utilizes a visual characteristic. For example, with the DPCM, degradation of a picture quality is rarely visibly perceived even when an error signal at each picture element is represented by only four bits. At any rate, the encoder input digital video signals are compressed into the predictive error signals by the encoder of the recursive type.

However, quantization errors inevitably accompany the quantized predictive error signals as a result of the above-mentioned nonuniform quantization. Inasmuch as the quantization errors are inevitable in the DPCM, information carried by the encoder input digital video signals is not completely preserved when decoder output digital video signals are produced in a decoder as reproductions of the encoder input digital video signal by the use of a decoding rule reversible to an encoding rule. This also applies to locally decoded digital video signals produced from the quantized predictive error signals in the encoder.

It has been a recent trend that video signals are prevalently edited or dubbed repetitively in a digital manner from an original video tape or tapes to another video tape. In such a case, the video signals must be memorized as digital video signals on each video tape. In order to digitalize such digital video signals, a sampling frequency should be more than 10 megahertz to sample the video signals. Taking the necessity of such high sampling frequency into account, it is preferable that the video signals are memorized on each video tape in the form of compressed digital signals, namely, predictive error signals by allowing the video signals to pass through a predictive encoder of a recursive type, as mentioned before.

In addition, on recording the compressed video signals from the original video tape(s) to another video tape, the compressed video signals should be once decoded into non-compressed, namely, original video signals for the purpose of monitoring video signals to be memorized on another video tape. Especially, monitoring operation is indispensable for recording a plurality of compressed video signals from a plurality of video tapes to another video tape. This is because the compressed video signals may be encoded by the use of encoding rules different from one another.

A decoder as described in conjunction with the recursive type of the predictive encoder must, therefore, be located between the above-mentioned encoder and another video tape.

When editing or dubbing is further repeated, a pair of encoder and decoder, which are similar in structure to those described before, should be connected in cascade to the decoder of the type described. Thus, repetitions of editing or dubbing necessitate a plurality of the aforementioned encoders and decoders. Since the quantization errors are inescapable in each of the encoders of the recursive types, picture qualities are gradually degraded with the repetitions of editing or dubbing owing to accumulation of the quantization errors in each of the encoders and the decoders.

Alternatively, another conventional code communication system comprises a predictive encoder having neither a feedback loop nor a quantizer in the encoder. The predictive encoder of the type described may, therefore, be called an encoder of a non-recursive type. Such a predictive encoder has been proposed in a paper contributed by Robert F. Rice et al to IEEE Transactions on Communication Technology, Vol. COM-19, No. 6 (December, 1971). The proposed encoder comprises an encoder predictor for predicting predictive signals in response to encoder input digital video signals in accordance with a preselected predictive function, namely, an encoding rule and a subtractor for subtracting the predictive signals from the encoder input digital video signals to produce predictive error signals representative of differences between the predictive signals and the encoder input digital video signals, respectively. As a rule, the encoder input digital video signals are given in the form of digital signals subjected to uniform quantization. Such predictive error signals are sent to a decoder as encoder output digital video signals without undergoing quantization.

It is mentioned here that the non-recursive type of the predictive encoder has usually been used in combination with a variable length encoder for encoding the predictive error signal into variable length codes, respectively, in order to reduce an amount of the encoder output digital video signals, as described in the above-referenced paper.

The variable length codes are received by the decoder as decoder input signals and can be decoded into decoder output digital video signals, respectively, without quantization errors by the use of a decoding rule reversible to the encoding rule, after decoded by a variable length decoder. The decoder output digital video signals are reproductions of the encoder input digital video signals and preserve information carried by the encoder input digital video signals. With the system comprising the predictive encoder of the non-recursive type, it is, therefore, possible to preserve information during transmission between the encoder and the decoder.

Because of information preservation, picture qualities are not reduced when the non-recursive types of the predictive encoders are used together with the corresponding decoders for the purpose of repeatedly editing or dubbing video signals in a digital manner. Certainly, each predictive encoder of the non-recursive type is profitable or beneficial on encoding still picture signals, such as facsimile signals. However, the conventional system comprising such a predictive encoder of the non-recursive type is not useful to encode the television signals into the compressed digital signals, as described below.

Herein, let the television signals, such as the NTSC television signals, be given as the encoder input digital video signals to be encoded by the use of the non-recursive type of the encoder. In this case, it should be noted here that the television signals are continuously and rapidly varied with time, different from still picture signals, such as facsimile signals.

Inasmuch as a wide variety of variable length codes appear from the variable length encoder during a long time, with code lengths widely and rapidly changed relative to one another when the television signals are converted to the variable length codes, the amount of the variable length codes sent from the variable length encoder becomes uncontrollable.

Moreover, when the variable length codes are transmitted to the decoder, namely, a receiver through a transmission line, they should be supplied to the transmission line at a specific transmission rate predetermined on the transmission line. It is, however, difficult to transmit the variable length codes at the specific transmission rate on the transmission line because of the uncontrollable amount of the variable length codes.

SUMMARY OF THE INVENTION

It is an object of this invention to provide an encoding system which is used for a predictive code communication system and is capable of efficiently encoding video signals including television signals.

It is another object of this invention to provide an encoding system of the type described, wherein information preservation is possible even on encoding the television signals.

It is a further object of this invention to provide an encoding system which is capable of supplying the video signals at a predetermined rate to a transmission line.

It is a yet further object of this invention to provide a decoding system which is convenient to cooperate with each of the encoding systems described before and which can carry out decoding operation reversible to encoding operation without loss of information.

It is a still further object of this invention to provide a predictive code communication system which is capable of editing or dubbing digital video signals without deterioration of picture qualities.

It is another object of this invention to provide an encoding system wherein a reduction of picture qualities is rarely visibly perceived even when encoding characteristics are varied in accordance with an amount of encoded video signals.

It is a further object of this invention to provide an editing system which can edit a pair of digital video signals by repeating encoding and decoding operation with information preserved.

It is a final object of this invention to provide an editing system to provide an editing system of the type described, wherein overflow and underflow does not take place in a buffer circuit used in an editing encoder.

An encoding system according to this invention is for encoding input digital video signals to produce transmission variable length codes at a predetermined rate. The encoding system comprises buffer means for storing buffer input codes to produce the stored input codes as the transmission variable length codes at the predetermined rate and to additionally produce an amount signal representative of an instantaneous amount of the stored input codes. The buffer means produces the transmission variable length codes together with a transmission control signal representative of the instantaneous amount. The system comprises control means responsive to the amount signal for producing an internal control signal representative of the instantaneous amount, preliminary processing means responsive to the internal control signal for preliminarily processing the input digital video signals in consideration of the instantaneous amount to produce preliminarily processed digital video signals, and predictive encoding means for predictively encoding the preliminarily processed digital video signals in accordance with a predetermined encoding rule to produce encoded error signals. The predetermined encoding rule is reversible to a decoding rule which is for use in decoding reproductions of the encoded error signals to produce reproductions of the preliminarily processed digital video signals. The system further comprises variable length encoding means having a plurality of selectable encoding characteristics and being responsive to the internal control signal for further encoding the encoded error signals to produce preliminary variable length codes in compliance with one of the selectable encoding characteristics that is selected as a selected encoding characteristic in consideration of the instantaneous amount at each instant. The selectable encoding characteristics define different code lengths, respectively. The preliminary variable length codes thereby are possessed of variable code lengths which are defined from time to time by the selected encoding characteristic. The system comprises signal supplying means for supplying the preliminary variable length codes to the buffer means as the buffer input codes, respectively.

BRIEF DESCRIPTION OF THE DRAWING

FIG. 13 shows a block diagram of a circuit applicable to the encoding device illustrated in FIG. 10;

FIG. 15 shows a block diagram of a band compression circuit used in the encoding device illustrated in FIG. 14;

FIG. 17 shows a circuit diagram of a quantizer used in the encoding device illustrated in FIG. 16;

DESCRIPTION OF THE PREFERRED EMBODIMENTS

Figure 1:
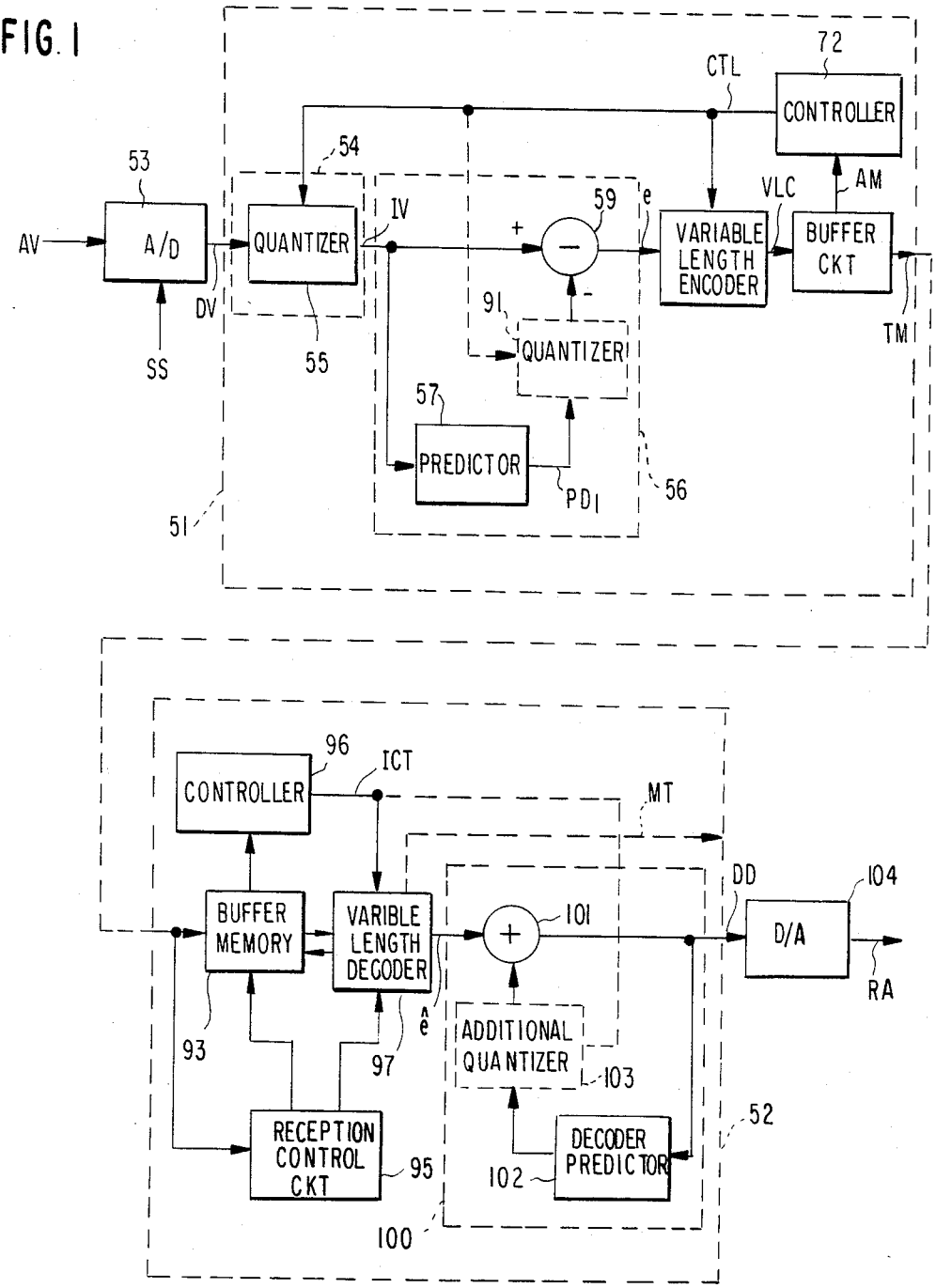
FIG. 1 shows a block diagram of a code communication system including an encoding device according to a first embodiment of this invention.

Referring to FIG. 1, an encoding system or device 51 according to a first embodiment of this invention is for use in combination with a decoding system or device 52. The encoding and the decoding systems 51 and 52 constitute a predictive code communication system. To begin with, description will be directed to the encoding device 51. The decoder 52 will be described in the later part of the instant specification.

In FIG. 1, an analog-to-digital converter 53 is supplied with analog video signals AV. Let the NTSC color television signals be given to the analog-to-digital converter 53 as the analog video signals AV. It is assumed that the analog video signals AV are sampled by the use of sampling clock pulses SS of a sampling frequency $f_s$ equal to three times the subcarrier frequency $f_{sc}$ at the analog-to-digital converter 53 to derive, from the analog video signals AV, a sequence of samples each of which is representative of 5 bits. As a result, a sampling period of the sampling clock pulses is equal to $(1/10.74) \times 10^6$ (sec). During a single horizontal scanning time interval, the number $n_H$ of the samples rises to 682.5. Each sample specifies a picture element.

The analog-to-digital converter 53 supplies the encoding device 51 with a sequence of encoder input digital video signals (will be simply referred to as input digital video signals) DV. The input digital video signals DV can specify thirty-two levels laid between minus 16 and plus 15, zero level inclusive.

Responsive to the input digital video signals DV, the encoding device 51 supplies transmission variable length codes at a predetermined rate through a transmission line (symbolized by a broken line) to the decoding device 52.

More particularly, the encoder device 51 comprises a preliminarily processing circuit or a pre-processing circuit 54 characterizing this invention. In the illustrated encoding device 51, a quantizer 55 is used as the pre-processing circuit 55 and is, therefore, shown by the same reference numeral as the pre-processing circuit 54. For the time being, it may be understood that the quantizer 55 has a plurality of selectable quantizing characteristics and quantizes the input digital video signals DV in accordance with a selected one of the quantizing characteristics to produce quantized digital video signals as intermediate digital video signals IV, although the quantizer 55 will later be described in detail. Each of the quantizing characteristics is for uniformly quantizing the input digital video signals DV and is different from non-uniform quantization characteristics used in the DPCM.

After quantization of the input digital video signals DV in the quantizer 55, the intermediate digital video signals IV are sent to a predictive encoder 56 which is of a non-recursive type, as shown in FIG. 1. The predictive encoder 56 comprises an encoder predictor 57 having a predetermined predictive function $P_1(z)$ for producing predictive signals $PD_1$ in response to the intermediate digital video signals IV in compliance with the predetermined predictive function $P_1(z)$, which will often be called a first predictive function later. A subtractor 59 subtracts the predictive signals $PD_1$ from the intermediate digital video signals IV to produce predictive error signals e. The predictive error signals e have the same bit numbers as the intermediate digital video signals IV, respectively.

Figure 2:
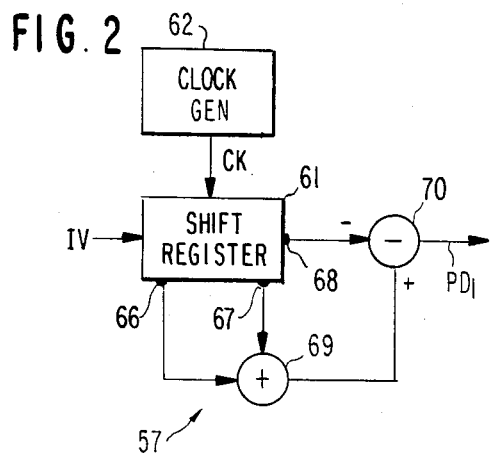
FIG. 2 shows a block diagram of an encoder predictor applicable to the encoding device illustrated in FIG. 1.

Temporarily referring to FIG. 2, the encoder predictor 57 illustrated in FIG. 1 is operable to produce the predictive signals $PD_1$ in accordance with the first predictive function $P_1(z)$ represented by a well-known z transform technique and given by:

$$P_1(z) = z^{-1} + z^{-2nH} - z^{-2nH-1}, \quad (1)$$

where z represents $\exp(j\omega/f_s)$, $\omega$ being an angular frequency. As mentioned before, the sampling frequency $f_s$ is three times as high as the subcarrier frequency $f_{sc}$ and the number $n_H$ in Equation (1) is, therefore, equal to 682.5.

In order to accomplish the above operation, the encoder predictor 57 comprises a shift register 61 for delaying the intermediate or preliminarily processed digital video signals IV in response to a succession of clock pulses CK appearing at every sampling period from a clock generator 62. The shift register 61 has a plurality of stages equal in a total number to 1366 and first, second, and third output terminals 66, 67, and 68 through which first, second, and third delayed signals are delayed from the intermediate digital video signals IV by the sampling periods of unity, 1365, and 1366, respectively. The first, the second, and the third delayed signals correspond to the first, the second, and the third terms of Equation (1) which are transformed by the use of the z transform technique, respectively. Herein, the number of 1365 is twice the number $n_H$ of samples appearing during the single horizontal scanning time interval. Therefore, the second delayed signal is delayed during two horizontal scanning time intervals relative to each intermediate digital video signal IV.

The calculation shown by Equation (1) is carried out by the use of an adder 69 and a subtractor 70. To this end, the first delayed signal is added in the adder 69 to produce a sum signal and, thereafter, the third delayed signal is subtracted from the sum signal in the subtractor 70. Eventually, the predictive signals $PD_1$, which are calculated in compliance with Equation (1), are sent to the subtractor 59 illustrated in FIG. 1. The predictor 57 may be called a predictive digital filter of a non-recursive type.

Turning back to FIG. 1, the subtractor 59 supplies a variable length encoder 71 with the predictive error signals e calculated by the subtractor 59 in an aforementioned manner. The variable length encoder 71 has a plurality of selectable encoding characteristics and is operated in cooperation with the quantizer 55 and a controller 72 in a manner to be described later. At any rate, the variable length encoder 71 encodes, in accordance with a selected one of the encoding characteristics, the predictive error signals e into variable length codes which may be called preliminary variable length codes VLC.

The preliminary variable length codes VLC are sent as buffer input codes to a buffer circuit 74 comprising a buffer memory of a bit capacity of several tens of kilobits and are stored in the buffer memory as stored codes. Simultaneously with storing the preliminary variable length codes, the buffer circuit 74 produces the stored codes as transmission variable length codes TM at the predetermined transmission rate to send them on the transmission line. The buffer circuit 74 comprises a checking circuit (not shown) for checking an instantaneous amount of information which is either supplied to the buffer memory as the preliminary variable length codes or stored as the stored codes in the buffer memory. For brevity of description, the amounts of the preliminary variable length codes and the stored codes will be called a first and a second amount, respectively, hereinafter. Such an amount of information can be checked either by calculating a difference between the number of code-written addresses of the buffer memory and the number of code-read out addresses thereof at each predetermined time interval, for example, each horizontal scanning time interval, to indicate the first amount or by detecting the number of the addresses storing the stored codes to indicate the second amount. The above-mentioned checking operation is possible by the use of a known circuit.

A selected one of the first and the second amounts is supplied to the controller 72 in the form of an information amount signal AM representative of the selected amount variable with a quantity of information remaining in the buffer memory. It is assumed that the information amount signal AM specifies a large, an intermediate, and a small quantity of information stored in the buffer memory when the selected amount of information is over two-third of the bit capacity of the buffer memory, intermediate between two-third and one-third thereof, and less than one-third thereof, respectively.

In addition, the buffer circuit 74 further comprises a transmitting circuit (not shown) for transmitting the transmission variable length codes TM from the buffer memory to the transmission line in the aforementioned manner with unique words and transmission control signals attached to the transmission variable length codes at every predetermined time interval, for example, every horizontal scanning time interval. Each of the unique words leads the following transmission variable length codes and serves to specify the leading one of the variable length codes while each of the transmission control signals corresponds to the information amount signal AM and, therefore, specifies large, intermediate, and small quantities of information, as is the case with the information amount signal AM. A conventional electric circuit can be used as the transmitting circuit.

Responsive to the information amount signal AM, the controller 72 delivers an internal control signal CTL of three bits to the quantizer 55 and the variable length encoder 71. The control signal CTL can specify each of the large, the intermediate, and the small quantities of the stored codes memorized in the buffer memory. Specifically, the most, the less, and the least significant bits of the control signal CTL correspond to the large, the intermediate, and the small quantities, respectively, each of which is specified by the fact that one of the three bits of the control signal CTL takes a logic "1" level, as will later be described.

Figure 3:
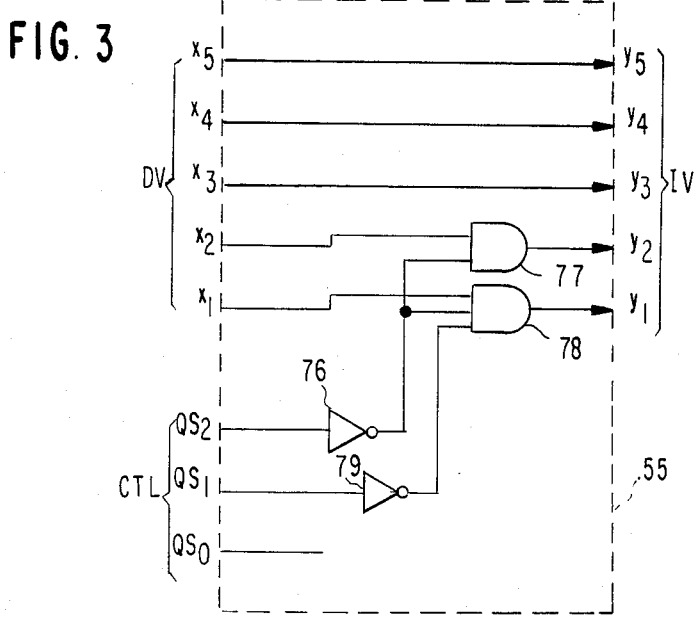
FIG. 3 shows a circuit diagram of a quantizer used in the encoding device illustrated in FIG. 1.

Referring to FIG. 3, the quantizer 55, which is operable as the pre-processing circuit 54 and schematically described with reference to FIG. 1, is supplied with the control signal CTL along with the input digital video signals, each having five bits denoted by $x_1$, $x_2$, $x_3$, $x_4$, and $x_5$. Among others, the bits $x_1$ and $x_5$ will be referred to as the least and the most significant bits of the input digital video signals DV and will be abbreviated to LSB and MSB, respectively. The LSB($x_1$) gives a reference value equal to unity and values represented by the five bits are given in the form of a multiple number of the reference value because each input digital video signal is subjected to uniform analog-to-digital conversion by the analog-to-digital converter 53. On the other hand, the MSB($x_5$) gives a sign bit representative of either of a positive and a negative value. The five bits of each input digital video signal DV is sent from the analog-to-digital converter 53 to the quantizer 55 as TWO's complements, although this is not always significant.

Likewise, the least, the less, and the most significant bits of the control signal CTL are represented by $QS_0$, $QS_1$, and $QS_2$, respectively. The most significant bit $QS_2$ of the control signal CTL is given through a first inverter 76 to both of first and second AND gates 77 and 78 supplied with the least significant bit but one $x_2$ and the LSD($x_1$), respectively, while the less significant bit $QS_1$ is given through a second inverter 79 to the second AND gate 78. In the illustrated quantizer 55, the least significant bit $QS_0$ is connected nowhere. Such a control signal CTL may be referred to as a mode control signal for determining operation mode of the quantizer 55 and the variable length encoder 71.

In FIG. 3, each of the intermediate digital video signals IV is represented by a variable number of bits in a manner to presently be described, although five bits $y_1$, $y_2$, $y_3$, $y_4$, and $y_5$ are illustrated as each intermediate digital video signal IV in this figure. Herein, let the least significant bit $QS_0$ of the control signal CTL take the logic "1" level. At this time, the remaining bits $QS_1$ and $QS_2$ take the logic "0" levels, as mentioned before. Under the circumstances, the five bits of each input digital video signal DV are produced as the five bits of the corresponding intermediate digital video signal without any change. Thus, the input digital video signals are in one-to-one correspondence to the intermediate digital video signals IV while the least significant bit $QS_0$ takes the logic "1" level. Inasmuch as the control signal CTL is variable at every predetermined time interval, for example, every horizontal scanning time interval, the control signal CTL is kept unchanged during at least one horizontal scanning time interval.

Subsequently, let the intermediate or less significant bit $QS_1$ of the control signal CTL take the logic "1" level. As a result, the second AND gate 78 is disabled by a logic "0" level signal which is produced by allowing the logic "1" level of the intermediate bit $QS_1$ to pass through the second inverter 79. Consequently, the five bits of each input digital video signal DV is quantized into four bits of the corresponding intermediate digital video signal IV with the least significant bit $y_1$ neglected from the intermediate digital video signal IV in question.

Likewise, let the most significant bit $QS_2$ take the logic "1" level. As readily understood from this figure, both of the first and the second AND gates 77 and 78 are disabled through the first inverter 76 in consequence of the logic "1" level given by the most significant bit $QS_2$. Thus, two bits $x_1$ and $x_2$ are intercepted by the first and the second AND gates 77 and 78 while three of the more significant bits $x_3$, $x_4$, and $x_5$ appear as the intermediate digital video signal IV. This means that three bits of the intermediate digital video signal IV are produced in response to the control signal CTL having the logic "1" level at the most significant bit $QS_2$.

As mentioned above, the number of significant bits in each intermediate digital video signal is changed in accordance with the control signal CTL with one and/or two of the less significant bits $y_1$ and/or $y_2$ neglected. The change of the significant bits indicates a variation of quantization step sizes. The neglected bit or bits may be processed as the logic "0" level which is insignificant.

It should be recollected here that the respective bits of the control signal CTL are made to correspond to the amounts, namely, quantities of information stored in the buffer memory described in conjunction with FIG. 1. Taking the above into consideration, it is readily understood that the three, the four, and the five bits of the intermediate digital video signals IV are sent from the quantizer 55 to the predictive encoder 56 in response to the control signal CTL.

In FIG. 1, the predictive encoder 56 is capable of preserving information carried by the intermediate digital video signals IV even when the number of bits are changed in the intermediate digital video signals IV in accordance with the control signal CTL. This is because the respective intermediate digital video signals IV are reproducible from the predictive error signals e and the predictive signals $PD_1$ by the use of a decoding rule reversible to the encoding rule determined in the encoder predictor 57.

Herein, it should be noted here that the predictive signals $PD_1$ are changed with variations of the intermediate digital video signals IV and appear from the encoder predictor 57 in the same quantization step sizes as the intermediate digital video signals IV, because the factors of all terms in Equation (1) are integers, such as 1, 1, and $-1$.

When the decoding rule is actually used in reproducing reproductions of the intermediate digital video signals, it is needless to say that reproduced predictive error signals, which are produced in accordance with the decoding rule, should be used in lieu of the predictive error signals e obtained by application of the encoding rule.

Figure 4:
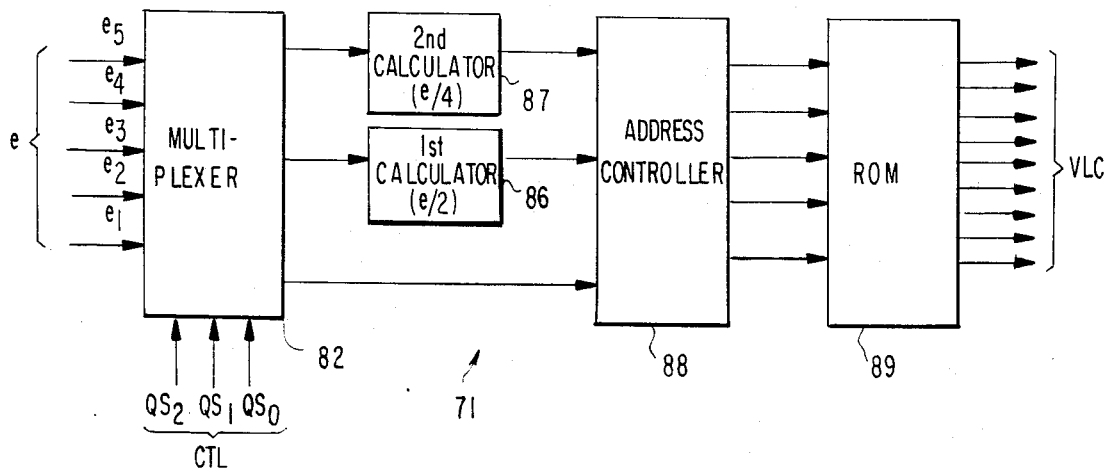
FIG. 4 shows a block diagram of a variable length encoder illustrated in FIG. 1.

Referring to FIG. 4, the variable length encoder 71 is operable in timed relation to the quantizer 55 illustrated in conjunction with FIG. 3 and supplied with the predictive error signals e given from the encoder predictor 56 illustrated in FIG. 1. Although each predictive error signal e is represented by five bits $e_1$, $e_2$, $e_3$, $e_4$, and $e_5$, where $e_1$ and $e_5$ are the least and the most significant bits, respectively, one and/or two of the less significant bits ($e_1$ and/or $e_2$) may be insignificant as a result of the change of the quantizing characteristics in the quantizer 55 and may take the logic "0" level.

In FIG. 4, the variable length encoder 71 comprises a multiplexer 82 responsive to each of the predictive error signals e and the control signal CTL having the least, the less, and the most significant bits $QS_0$, $QS_1$, and $QS_2$. Responsive to each control signal CTL, the multiplexer 82 delivers each of the predictive error signals e direct to an address controller 83 or through a first or a second calculator 86 or 87 to the address controller 88. More particularly, when the least significant bit $QS_0$ of the control signal CTL takes the logic "1" level with the remaining more significant bits $QS_1$ and $QS_2$ kept at the logic "0" levels, the five bits of each predictive error signal e are directly supplied as an uncontrolled error signal from the multiplexer 82 to the address controller 88. The direct supply of each predictive error signal e may be called a direct mode. When the intermediate significant bit $QS_1$ is kept at the logic "1" level, the multiplexer 82 sends a first controlled one of the predictive error signals e to the first calculator 86. The logic "0" level is located at the least significant bit $e_1$ of the specific predictive error signal e. From this fact, it is readily understood that the first controlled predictive error signal e is equivalent to a signal quantized by twice the reference value as discussed in conjunction with the LSB of the input digital video signals DV. The first controlled predictive error signal e represents either one of sixteen values selected from thirty-two values which can express five bits. The sixteen values can be denoted by a decimal notation in the form of 0, $\pm 4$, $\pm 6$, $\pm 8$, $\pm 10$, $\pm 12$, $\pm 14$, and $-16$. Processing operation for the first controlled predictive error signal e may be called a first mode.

Likewise, a second controlled one of the predictive error signals e, which has the logic "0" levels at both of the least significant bit $e_1$ and the least significant bit but one $e_2$, is delivered from the multiplexer 82 to the second calculator 87 when the most significant bit $QS_2$ of the control signal CTL takes the logic "1" level. The second controlled predictive error signal e is equivalent to a signal quantized by a quantization step size which is as high as four times the reference value. The second controlled predictive error signal e takes a selected one of eight values selected from the thirty-two values. The eight values can be expressed by the use of the decimal notation as 0, $\pm 4$, $\pm 8$, $\pm 12$, and $-16$. Operation for the second controlled predictive error signal may be referred to as a second mode.

In the direct mode mentioned before, an uncontrolled one of the predictive error signals e of five bits is given to the address controller 88 coupled to a read-only memory (ROM) 89. The ROM 89 has thirty-two addresses to memorize thirty-two kinds of variable length codes in the respective addresses. Such variable length codes can be made out by the use of the Huffman coding algorithm, and are listed in the second and the fourth columns of Table 1. As shown in Table 1, the longest one of the listed variable length codes has a code length of nine bits while the shortest one, a code length of two bits.

TABLE 1

| Code Numbers | Variable Length Codes | Code Numbers | Variable Length Codes |
|---|---|---|---|
| 15 | 000000001 | −16 | 100000001 |
| 14 | 000000010 | −15 | 100000010 |
| 13 | 000000011 | −14 | 100000011 |
| 12 | 000000100 | −13 | 100000100 |
| 11 | 000000101 | −12 | 100000101 |
| 10 | 000000110 | −11 | 100000110 |
| 9 | 000000111 | −10 | 100000111 |
| 8 | 00000100 | −9 | 10000100 |
| 7 | 00000101 | −8 | 10000101 |
| 6 | 00000110 | −7 | 10000110 |
| 5 | 00000111 | −6 | 10000111 |
| 4 | 000010 | −5 | 100010 |
| 3 | 000011 | −4 | 100011 |
| 2 | 0001 | −3 | 1001 |
| 1 | 001 | −2 | 101 |
| 0 | 01 | −1 | 11 |

In Table 1, code numbers (N) denoted by the decimal notation are also enumerated in the first and the third columns in one-to-one correspondence to the variable length codes. The code numbers (N) correspond to the values represented by the five bits of the uncontrolled predictive error signal e. The code numbers (N) may be considered as specifying the thirty-two addresses of the ROM 89. The reason why the code numbers (N) are enumerated in Table 1 will presently become clear.

As well known in the art, a short and a long one of the variable length codes are assigned to the uncontrolled predictive error signal e having a high and a low incidence, namely, a probability of occurrence, respectively. Therefore, the codes of "11" and "01" appear most frequently as the exemplified variable length codes at a probability of 25%.

When the uncontrolled predictive error signal e appears in the direct mode, it specifies a selected one of the code numbers (N) that corresponds to one of the addresses. Therefore, the relationship between the uncontrolled predictive error signal e and the corresponding code number (N) is given by:

$$N = [e], \qquad (2)$$

where a pair of brackets in Equation (2) represent Gauss' notation. Use of the Gauss' notation implies that the encoded predictive errors e result from quantizing the input digital video signals DV into the intermediate digital video signals IV. Thus, the intermediate digital video signals IV represent only integral parts. In addition, all of the factors are integers in the first predictive function $P_1(z)$. As a result, the encoded predictive error signals e are representative of integers in the illustrated predictive encoder 56.

From the above, it is readily understood that the address controller 88 converts the code numbers (N) into address signals of five bits specifying the addresses of the ROM 89. The ROM 89 produces the variable length codes VLC from the addresses specifying the address signals, respectively.

In the first mode, the first calculator 86 is operated to divide the first controlled predictive error signal e by two. As a result, the relationship between the first controlled predictive error signal e and the corresponding code number (N) is represented by:

$$N = [e/2]. \qquad (3)$$

The first controlled predictive error signal e takes either one of the sixteen values enumerated before. Each code number (N) becomes equal to a half of each enumerated values on production of the first controlled predictive error signal e. For instance, let the first controlled predictive error signal e be equal to −2. At this time, the code number (N) becomes −1 and, therefore, the variable length code of "11" is selected in correspondence to the code number (N) of 31 1. Thus, the variable length code VLC in question is read out of an address corresponding to the code number (N) resulting from the division specified by Equation (3).

In the second mode, the second calculator 87 divides the second controlled predictive error signal e by four to decide one of the code numbers that is to be allotted to the second controlled predictive error signal e. Thus, the division is given by:

$$N = [e/4]. \qquad (4)$$

In consequence of the division, each code number (N) is equal to one fourth of each value represented by the second controlled predictive error signal e. Therefore, the values of 0, ±4, ±8, ±12, and −16 determined for the second controlled predictive error signal e are reduced to the code numbers of 0, ±1, ±2, and ±3, and −4, respectively. These reduced code numbers (N) are converted by the address controller 88 to the address signals specifying the addresses which correspond to the reduced code numbers (N) of 0, ±1, ±2, ±3, and −4 respectively.

From this fact, it is readily understood that the illustrated variable length encoder 71 has three of the selectable encoding characteristics to encode the predictive error signals e into the variable length codes VLC, namely, the preliminary variable length codes in response to a selected one of the three encoding characteristics.

In addition, there is a high probability that the variable length codes in the first and the second modes become shorter than those in the direct mode, because the less code numbers (N) in the first and the second modes are frequently used as compared with those in the direct mode. For a similar reason, short length codes appear more frequently in the second mode than in the first mode.

Taking the above into consideration, the preliminary variable length codes are memorized in the buffer memory in the direct, the first, and the second modes when the buffer memory memorizes the small, the intermediate, and the large quantities of the stored codes, respectively. Thus, the amount of information stored in the buffer memory becomes controllable and the stored codes can be continuously transmitted to the transmission line at the predetermined transmission rate. Hence, the illustrated encoding device 51 can be available to encode the television signals continuously variable with time.

Since the respective factors of the predictive function $P_1$ are integers, the quantization step size of the intermediate digital video signals IV is identical with that of the predictive signals $PD_1$, unless the quantization characteristics in the quantizer 55 are switched from one to the other. In this case, the quantization step size of the predictive error signals e is also identical with that of the intermediate digital video signals IV, as mentioned before. As a result, the values represented by the predictive error signals e are coincident with the code numbers, twice of them, and quadruple of them in the direct, the first, and the second modes, respectively. Thus, the predictive error signals e resulting from the respective quantization characteristics are in one-to-one correspondence to the code numbers (N) listed in Table 1.

On switching the quantization characteristics of the quantizer 55 from one to the other, noncoincidence of the quantization step sizes takes place between the intermediate digital video signals IV and the predictive signals $PD_1$. To avoid this noncoincidence, an additional quantizer 91 depicted at a broken line may be located between the encoder predictor 57 and the subtractor 59 to simultaneously carry out operation similar to the quantizer 55. Namely, the additional quantizer 91 may be similar in structure to the quantizer 55. Alternatively, the encoder predictor 57 may be reset at every switching of the quantization step sizes of the quantizer 55 to directly send the intermediate digital video signals IV through the subtractor 59 as the predictive error signals e.

Further referring to FIG. 1, the decoding device 52 is coupled through the transmission line to the encoding device 51 thus far been described above and is operable in cooperation with the encoding device 51. The decoding device 52 is supplied with the transmission variable length codes TM accompanied by the transmission control signal. The transmission variable length codes are once stored at the transmission rate in a decoder buffer circuit 93 together with the transmission control signal. The unique word accompanied by these signals is supplied to a reception control circuit 95 to make the decoder buffer circuit 93 deliver the transmission control signal to a decoder controller 96 and to make a variable length decoder 97 send a readout request to the decoder buffer circuit 93.

Responsive to the transmission control signal, the decoder controller 96 supplies the variable length decoder 97 with an inner control signal ICT representative of a reproduction of the inner control signal CTL illustrated in FIGS. 1, 3, and 4. The variable length decoder 97 has a plurality of selectable decoding characteristics corresponding to the selectable encoding characteristics described with reference to FIG. 4. When the transmission variable length codes are read out of the decoder buffer circuit 93 as read out variable length codes in response to the inner control signal ICT, the variable length decoder 97 decodes the read out variable length codes into decoded predictive error signals ê in accordance with a selected one of the decoding characteristics. Such decoding operation is reversible to encoding operation described in conjunction with FIG. 4 and Table 1. More particularly, the respective decoding characteristics, which correspond to the encoding characteristics shown by Equations (2), (3), and (4), are expressed by $$ê = N, \quad (5)$$

$$ê = 2 \times N, \quad (6)$$

and $$ê = 4 \times N. \quad (7)$$

Thus, the read out variable length codes indicate the code numbers (N) and are modified in accordance with the inner control signal ICT into modified code numbers, such as N, 2N, and 4N, in the direct, the first, and the second modes described in conjunction with the variable length encoder 71, as understood from Equations (5), (6), and (7), respectively. The modified code numbers specify decoded variable length codes listed in Table 1 and the decoded variable length codes are produced as the decoded predictive error signals ê, respectively. The decoded predictive error signals ê are made to correspond to reproductions of the encoded predictive error signals, respectively. It is readily possible for those skilled in the art to constitute such a variable length decoder 97 by modifying the variable length encoder 71 illustrated with reference to FIG. 4.

A predictive decoder 100 is coupled to the variable length decoder 97 and decodes the decoded predictive error signals ê by the use of the decoding rule to produce as decoded digital signals DD reproductions of the intermediate digital video signals produced from the quantizer 55. More particularly, the predictive decoder 100 comprises an adder 101 for adding the decoded predictive error signals ê and input predictive signals to produce the decoded digital signals DD and a decoder predictor 102 having the same predictive function $P_1(z)$ as that expressed by Equation (1). The decoder predictor 102 is supplied with a current one of the decoded digital signals DD at a current sampling instant to produce a predictive signal given at the next following sampling instant in accordance with the predictive function $P_1(z)$. Thus, the predictive decoder 100 is reverse in operation to the predictive encoder 56. Accordingly, information carried by the intermediate digital video signals is preserved in the decoded digital video signals DD.

When the quantizer 91 is additionally connected between the encoder predictor 57 and the subtractor 59 in the encoding device 51, an additional quantizer 103 depicted by a broken line is connected between the decoder predictor 102 and the adder 101 and controlled by the inner control signal in order to make the quantization step sizes coincide with each other at the encoder and the decoder devices 51 and 52 when the quantization step sizes are switched at the quantizer 55. Likewise, when the encoder predictor 57 is reset in accordance with variations of the quantization step sizes in the quantizer 55, the decoder predictor 102 should be reset in response to the inner control signal ICT, although not explicitly illustrated in FIG. 1.

The decoded digital video signals thus produced by the predictive decoder 100 are supplied to a digital-to-analog converter 104 to be produced as reproduced analog signals RA.

Figure 5:
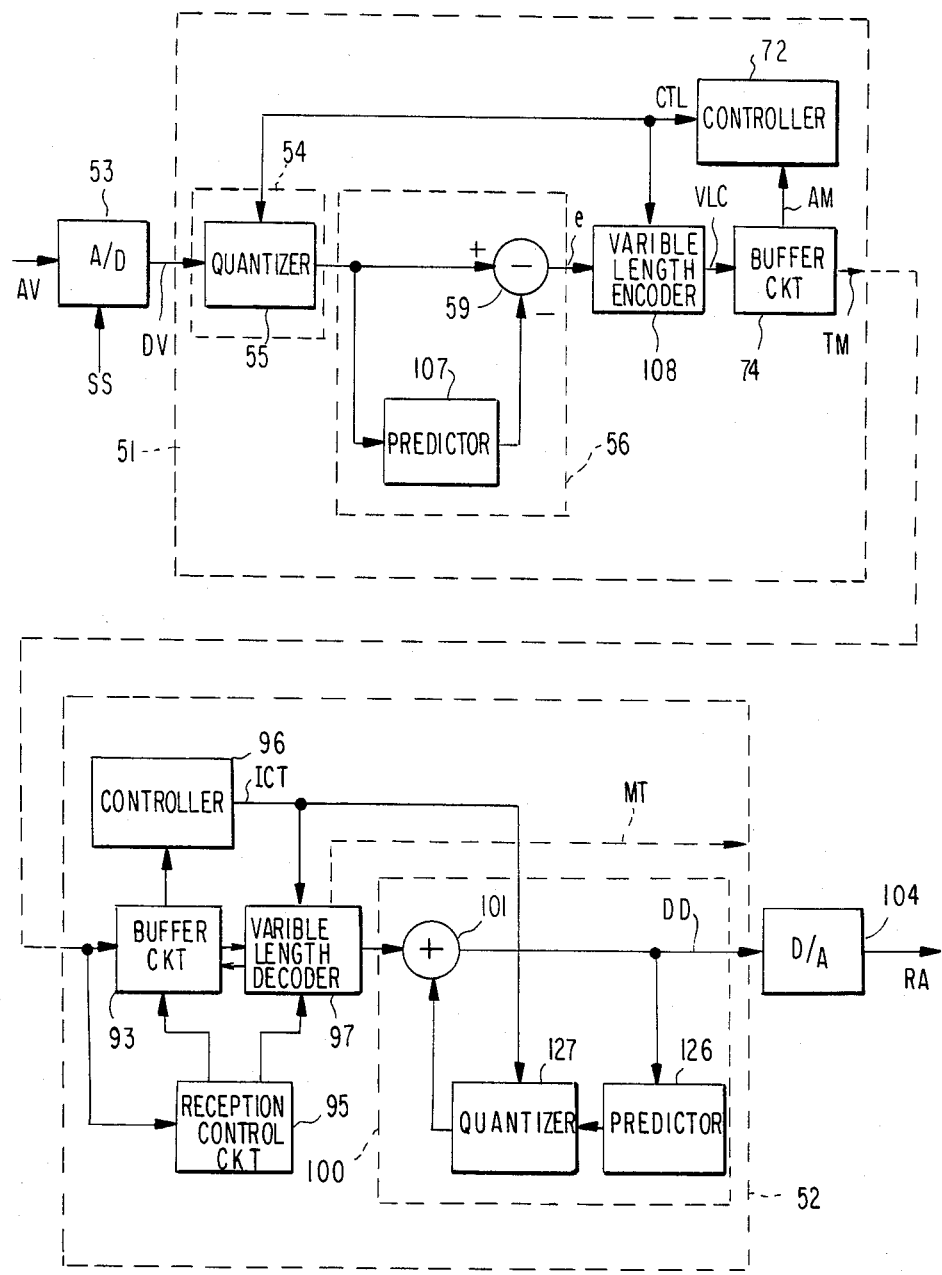
FIG. 5 shows a block diagram of a code communication system including an encoding device according to a modification of the first embodiment of this invention.

Referring to FIG. 5, an encoding system 51 according to a modification of the first embodiment is similar in structure to that illustrated with reference to FIG. 1 except that an encoder predictor 106 is operable in accordance with a preselected one of second and third predictive functions $P_2(z)$ and $P_3(z)$ different from the predictive function $P_1(z)$ expressed by Equation (1) and a variable length encoder 107 is operatively coupled to the encoder predictor 106 and the subtractor 59. The second and the third predictive functions $P_2(z)$ and $P_3(z)$ are given by:

$$P_2(z) = 0.5z^{-1} + z^{-3} - 0.5z^{-4} \qquad (8)$$

and $$P_3(z) = z^{-2nH}, \qquad (9)$$

respectively.

The second predictive function $P_2(z)$ has two factors less than a decimal point and a single integer factor. The third predictive function $P_3(z)$ predicts a current one of the predictive signals $PD_1$ from one of the intermediate digital video signals IV that is present two horizontal scanning time intervals before.

Figure 6:
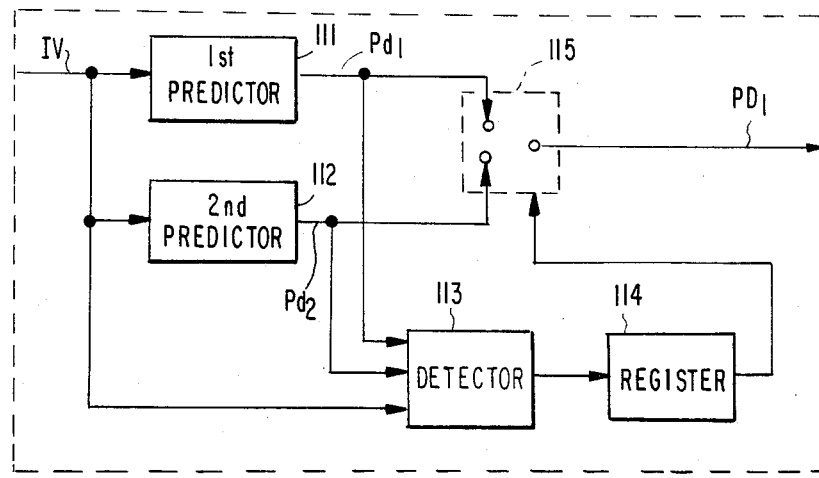
FIG. 6 shows a block diagram of a predictor applicable to the encoding device illustrated in FIG. 5.

Temporarily referring to FIG. 6, the predictor 107 comprises first and second predictors 111 and 112 having characteristics determined by the second and the third predictive functions $P_2(z)$ and $P_3(z)$, respectively. Supplied with the intermediate digital video signals IV, the first and the second predictors 111 and 112 deliver first and second preliminary predictive signals $Pd_1$ and $Pd_2$ to a detector 113, respectively. The detector 113 is supplied with the intermediate digital video signals IV also and selects ones of the first and the second preliminary predictive signals $Pd_1$ and $Pd_2$ that are nearer to the intermediate digital video signals IV. The logic "0" level signals are sent from the detector 113 when the first preliminary predictive signals $Pd_1$ are nearer to the intermediate digital video signal IV than the second preliminary predictive signals $Pd_2$. Otherwise, the logic "1" level signals appear from the detector 113. The logic "0" and the logic "1" level signals are delayed a single sampling period in a register 114 and are, thereafter, supplied to a switching circuit 115 to select the first and the second preliminary predictive signals $Pd_1$ and $Pd_2$, respectively. The selected preliminary predictive signals are produced as the predictive signals $PD_1$.

When the first preliminary predictive signals $PD_1$ appear as the predictive signals $PD_1$, it should be noted that the predictive signals $PD_1$ are determined by the second predictive function $P_2(z)$ accompanying the factors having decimal parts. This means that the predictive signals $PD_1$ include decimal parts together with integral parts in digital forms.

Incidentally, a current one of the predictive signals $PD_1$ is predicted by the use of each one of the first and the second preliminary predictive signals that appears at a sampling instant or point one sampling time interval before a current sampling point. No switching signal is therefore necessary to switch the second and the third predictive functions $P_2(z)$ and $P_3(z)$ in the illustrated predictor 107.

Figure 7:
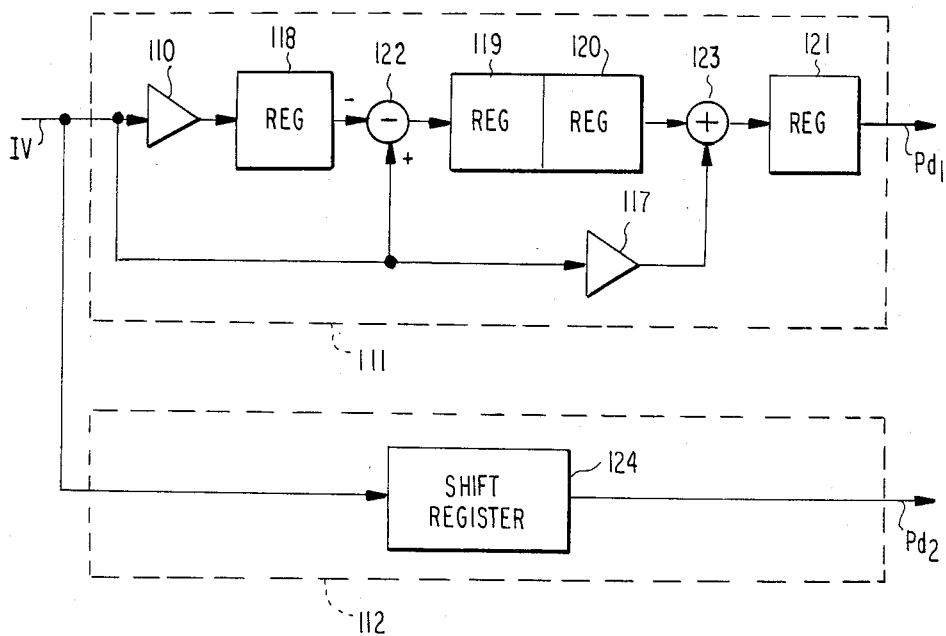
FIG. 7 shows a block diagram of a first and a second predictor included in the predictor illustrated in FIG. 6.

Referring to FIG. 7 for a while, the first predictor 111 comprises two of multipliers 116 and 117, each giving the factor of 0.5, four of registers 118, 119, 120, and 121, each having a delay equal to one sampling time interval, a single subtractor 122, and a single adder 123. The first predictor 111 is called a non-recursive digital filter and operable in accordance with the second predictive function $P_2(z)$ to produce the first preliminary predictive signal $Pd_1$ in response to the intermediate digital video signals IV, as readily understood from this figure. On the other hand, the second predictor 112 comprises a shift register 124 having a delay time equal to twice the horizontal scanning time intervals, namely, the sampling clock periods of 1365.

Turning back to FIG. 5, the predictive encoder 107 according to this modification does not use the quantizer 91 illustrated in FIG. 1. Accordingly, the predictive signals $PD_1$ are directly supplied to the subtractor 59. As a result, the subtractor 59 produces the encoded predictive error signals e accompanied by the decimal parts resulting from those of the predictive signals $PD_1$. Herein, it should be recalled that the intermediate digital video signals IV are produced by cutting off or omitting the decimal parts from the input digital video signals DV, as described in conjunction with Table 1.

Referring to FIG. 5 again, the variable length encoder 108 is for encoding the encoded predictive error signals e into variable length codes VLC by rounding up or raising the decimal parts accompanying the encoded predictive error signals e in order to reduce or compromise any influence of omitting the decimal parts on quantization. Such operation will be more detailed hereinafter. Let a certain number x in a pair of angled parentheses $<>$ define an integer caused by rounding up the decimal part of the number x. When such a sign denoted by the angled parentheses is used, the relationships between the encoded predictive error signals e and the code numbers (N) listed in Table 1 are given as first, second, and third encoding characteristics by:

$$N = <e>, \qquad (10)$$

$$N = <e/2>, \qquad (11)$$

and $$N = <e/4>. \qquad (12)$$

It is obvious that Equations (10), (11), and (12) correspond to Equations (2), (3), and (4), respectively. This means that the variable length encoder 71 shown in FIG. 4 may be modified to give the first through the third encoding characteristics. In order to carry out calculation expressed by Equations (10), (11), and (12), three round-up calculation circuits may be located between the multiplexer 82 and the address controller 88 illustrated in FIG. 4, instead of the first and second calculators 86 and 87. In this structure, let the encoded predictive error signals e be equal to $-3$ when the second encoding characteristics expressed by Equation (11) is specified by the internal control signal CTL shown in FIG. 4. At this time, the code number N becomes equal to $-1$ and, therefore, the corresponding variable length code becomes "11", as apparent from Table 1.

Further referring to FIG. 5, the variable length decoder 97 is operable in cooperation with the reception control circuit 95, the decoder buffer circuit 93, and the decoder controller 96 in a manner described with reference to FIG. 1. The variable length decoder 97 decodes the read out variable length codes in response to the inner control signal ICT to produce the read out variable length codes as the decoded predictive error signals in accordance with the decoding characteristics expressed by Equations (5), (6), and (7).

The predictive decoder 100 is coupled to the variable length decoder 97 to decode the decoded predictive error signals ê into the decoded digital video signals DD. For this purpose, the illustrated decoder 100 comprises a decoder predictor 126 comprising the same structural elements as the encoder predictor 107 illustrated in FIG. 6. Accordingly, the decoder predictor 126 is operated to produce preliminarily decoded predictive signals in accordance with one of the second and the third predictive functions $P_2(z)$ and $P_3(z)$ shown by Equations (8) and (9). The preliminary decoded predictive signals include not only integral parts but also decimal parts and are supplied to a decoder quantizer 127. Inasmuch as the decoder quantizer 127 has the same quantization characteristics as the quantizer 55 and switches the quantization characteristics from one to another in response to the inner control signal ICT, only the integral parts are supplied as the predictive signals to the adder 101, with the decimal parts omitted from the predictive signals. As a result, the adder 101 produces the reproductions of the intermediate digital video signals IV as the decoded digital video signals DD in response to the decoded predictive error signals ê and the predictive signals.

It should be noted here that the intermediate digital video signals IV are identical with the decoded digital video signals DD unless any transmission errors occur during transmission. In other words, information carried by the intermediate digital video signals IV is exactly preserved in the decoded digital video signals DD.

Figure 8:
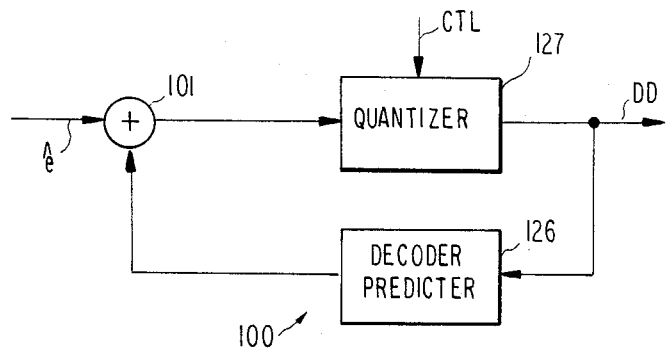
FIG. 8 shows a block diagram of a predictive decoder applicable to a decoding device illustrated in FIG. 5.

Referring to FIG. 8, another predictive decoder 100 is also available to the decoding device 52 illustrated in FIG. 5 and comprises the same structural elements as that illustrated in FIG. 5, with a combination of the structural elements alone different from the predictive decoder of FIG. 5. The illustrated predictive decoder 100 is operable in response to the decoded predictive error signals ê supplied to the adder 101. As readily understood from FIG. 8, the quantizer 127 is supplied with output signals of the adder 101 to quantize the adder output signals into quantized signals in response to the internal control signal CTL to produce the quantized signals as the decoder digital video signals DD. In this structure, the decimal parts accompanied by the predictive signals are omitted from the decoded digital video signals DD by round-up operation of the quantizer 127. Thus, information preservation is accomplished in this structure also.

Figure 9:
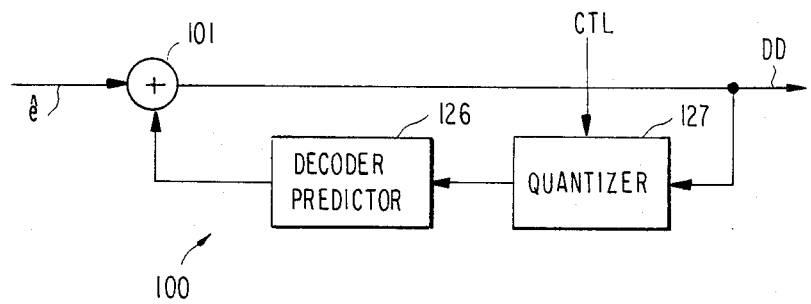
FIG. 9 shows a block diagram of another predictive decoder available to the decoding system illustrated in FIG. 5.

Referring to FIG. 9, a similar predictive decoder 100 can be substituted for that illustrated in FIG. 5 and comprises the quantizer 127 located before the decoder predictor 126. Therefore, the decoded digital video signals DD are first quantized by the quantizer 127 and are thereafter supplied to the decoder predictor 126 to supply the predictive signals to the adder 101 responsive to the decoded predictive error signals ê. Similar operation is accomplished by this structure.

Figure 10:
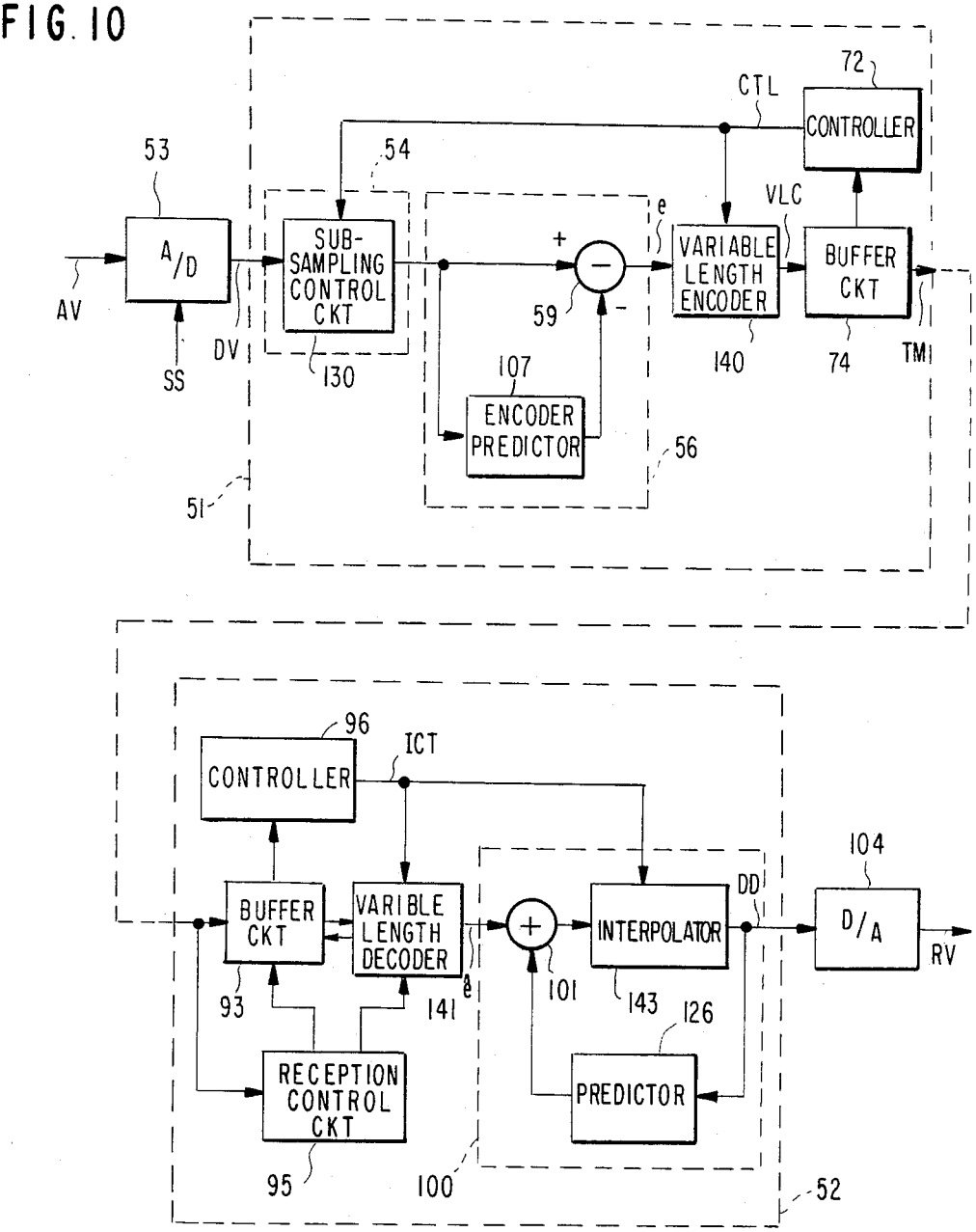
FIG. 10 shows a block diagram of a code communication system including an encoding device according to a second embodiment of this invention.

Referring to FIG. 10, an encoding device according to a second embodiment of this invention is similar to that illustrated with reference to FIG. 5 except that the input digital video signals DV supplied through the analog-to-digital converter 53 are preliminarily processed to be thinned out, namely, sub-sampled in accordance with the amount of the information stored in the buffer circuit 74. For this purpose, the preliminary processing circuit 54 comprises a sub-sampling control circuit 130 operable in a manner to be described later.

Temporarily referring to FIGS. 11(a), (b), and (c), sub-sampling operation is for thinning out, namely, sub-sampling picture elements represented by the respective input digital video signals DV. In FIG. 11(a), the picture elements which form a part of picture are arranged along four successive horizontal scanning lines which are vertically successively named $(L-3)$-th, $(L-2)$-th, $(L-1)$-th and L-th lines, with no picture elements sub-sampled or thinned out from the respective lines $L-3\sim L$, as suggested by small circles. Thus, all of the picture elements appear as unthinned picture elements on the picture. As shown in FIGS. 11(a) $\sim$ (c), the picture elements along one of the scanning lines are phase-shifted from those located along the adjacent scanning lines on the picture.

In FIg. 11(b), particular ones of the picture elements are thinned out or sub-sampled at every other one of the scanning lines, as shown by crisscrosses, and appear as thinned picture elements along the $(L-2)$-th and the L-th lines. Moreover, the thinned picture elements exist every second unthinned picture element along each of the $(L-2)$-th and the L-th lines. In this case, the unthinned or the remaining picture elements are reduced to five sixth of the total number of the picture elements illustrated in FIG. 11(a).

In FIG. 11(c), thinned or deleted picture elements denoted by the crisscrosses appear along every scanning line at every second unthinned picture element. The number of the remaining or the unthinned picture elements decreases to two third of the total number of the picture elements.

Herein, characteristics for the arrangements of the picture elements shown in FIGS. 11(a), 11(b), and 11(c) will be called first, second, and third sub-sampling or thinning characteristics, although no picture elements are thinned out or sub-sampled in the first thinning characteristic.

Figures 11, 12:
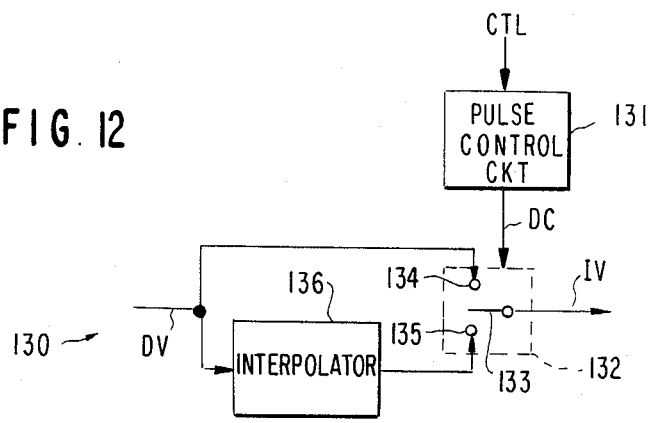
FIG. 11 schematically shows an arrangement of picture elements to describe thinning operation carried out in the encoding device illustrated in FIG. 10.
FIG. 12 shows a block diagram of a thinning control circuit used in the encoding device illustrated in FIG. 10.

Referring to FIG. 10 again and FIG. 12 afresh, the sub-sampling control circuit 130 comprises a pulse control circuit 131 responsive to the internal control signal CTL for defining the first, the second, and the third sub-sampling characteristics. In other words, one of the first through the third sub-sampling characteristics is selected in accordance with the instantaneous amount represented by the internal control signal CTL. As mentioned before, the particular picture elements are thinned out or deleted when the second and third sub-sampling characteristics. In order to accomplish such operation, the particular picture elements are decided or designated with time. For this purpose, the pulse control circuit 131 produces decision or designation pulses DC in synchronism with the particular picture elements specified from time to time by one of the second and the third sub-sampling characteristics. No designation pulse is produced when the first sub-sampling characteristic is specified by the internal control signal CTL. Such a pulse control circuit 131 is readily structured by a timing controller for generating a plurality of pulse sequences which are variable in repetition frequencies and which are synchronized with the particular picture elements.

In FIG. 12, the sub-sampling control circuit 130 comprises a switching circuit 132 having a switching terminal 133 and first and second terminals 134 and 135. The switching terminal 133 is connected to the first and the second terminals 134 and 135 during absence and presence of the decision pulses DC, respectively. Therefore, the input digital video signals DV are produced through the first and the switching terminals 133 and 134 as the intermediate digital video signals IV during absence of the designation pulses DC. During persence of the designation pulses DC, the switching terminal 133 is connected through the second terminal 135 to an interpolator 136 supplied with the input digital video signals DV. As a result, particular ones of the input digital video signals DV that represent the particular picture elements are deleted or thinned out from the input digital video signals DV and the remaining video signals of the input digital video signals DV are produced through the switching circuit 133. Thus, the switching terminal 133 and the first terminal 134 serves to delete the particular video signals. The illustrated sub-sampling control circuit 130 substituted output signals of the interpolator 136 for the particular picture video signals. More specifically, the interpolator 136 successively estimates or interpolates each of the input digital video signals DV by the use of a predetermined transfer function H(z) which defines a filter characteristic and which is given by:

$$H(z) = 0.5z^{-1} + 0.5z^{-681} - 0.5z^{-682} + 0.25z^{-684} + 0.25z^{-1365} \quad (13)$$

From Equation (13), it is readily understood that each input digital video signal DV is estimated or interpolated from a predetermined number of the input digital video signals which are adjacent to each input digital video signal DV. The predetermined number is equal to five. In addition, when a specific video signal to be estimated or interpolated is assumed to represent a specific picture element xx in FIG. 11(c), Equation (13) shows that the specific video signal xx is estimated from input digital video signals representing picture elements aa, bb, cc, dd, and ee with factors of 0.5, 0.25, −0.5, 0.5, and 0.25 weighed, respectively.

Thus, the interpolator 136 successively, as the interpolator output signals, produces estimated digital video signals which are estimated for the respective input digital video signals DV.

The estimated digital video signals are supplied from the interpolator 136 to the second terminal 135. When the particular video signals appear in synchronism with the designation pulses DC, particular ones of the estimated digital video signals that are estimated for the particular video signals are produced through the second terminal 135 and the switching terminal 133. Thus, the particular estimated digital video signals are combined with the remaining or the unthinned digital video signals to produce combined digital video signals. Thus, the second terminal 135 is operable to combine the particular estimated digital video signals with the remaining input digital video signals DV.

Referring back to FIG. 10, the combined digital video signals are supplied as the intermediate digital video signals, namely, the preliminarily processed signals IV from the sub-sampling control circuit 130 to the predictive encoder 56 similar in structure to that illustrated with reference to FIG. 5. The predictive encoder 56 produces, as the encoded predictive error signals e, first and second predictive error signals for the remaining digital video signals and for the particular estimated digital signals, respectively. Production of the first and the second predictive error signals is implemented by an encoder predictor 107 similar to that illustrated with reference to FIG. 5.

Responsive to the encoded predictive error signals e, the variable length encoder 140 selects only the first predictive error signals with reference to the internal control signal CTL. Such selection is readily possible by the use of a timing controller synchronized with the pulse control circuit 131 described in conjunction with the thinning circuit 130. Thereafter, the selected predictive error signals are encoded into the preliminarily variable length codes VLC by the use of a circuit comprising round-up calculators described in conjunction with the variable length encoder of FIG. 5 and an ROM as shown in FIG. 4.

Thus, the encoding characteristics of the illustrated variable length encoder 140 are used to select or define the first predictive error signals at timings predetermined for the respective encoding characteristics.

Further referring to FIG. 10, a decoder 52 coupled to the encoder 51 illustrated with reference to FIG. 10 is similar in structure to that illustrated in FIG. 5 except that a variable length decoder 141 is operable in accordance with one of the subsampling characteristics specified by the inner control signal ICT and that an interpolator 143 is located in place of the quantizer 127 illustrated with reference to FIG. 5. Like the variable length encoder 140, the variable length decoder 141 comprises a timing controller (not shown) for producing a plurality of timing pulses in accordance with the thinning characteristics selectable by the inner control signal ICT. The variable length decoder 141 decodes the read out variable length codes into the decoded predictive error signals ê during presence of the timing pulses. This means that such decoding operation is carried out at time instants at which unthinned picture elements appear from the buffer circuit 93. On the other hand, the variable length decoder 141 produces a preselected signal representative of a preselected value of, for example, 0 at a time instant at which thinned or deleted picture elements are produced.

Responsive to the decoded predictive error signals ê, the predictive decoder 100 comprises a predictor 126 similar to that illustrated in FIG. 5 and operable in accordance with the second and the third predictive functions P₂(z) and P₃(z). The predictor 126 produces the predictive signals from the decoded digital video signals DD to supply the predictive signals to the adder 101. Responsive to the decoded predictive error signals ê and the predictive signals, the adder 101 produces sum signals. The sum signals does not give true decoded signals on production of the thinned or deleted picture elements. Taking the above into consideration, the interpolator 143 is similar in structure to the sub-sampling control circuit 130 illustrated in FIG. 12 and adaptively carries out interpolation in response to the inner control signal ICT by estimating each thinned or deleted picture element from the remaining or unthinned picture elements in a manner mentioned in conjunction with FIG. 12. Thus, the interpolator 143 delivers the decoded digital video signals DD to the digital-to-analog converter 104 and to the decoder predictor 126. At any rate, the decoded digital video signals DD are reproductions of the preliminarily processed digital video signals IV which are subjected to interpolation or estimation described in FIG. 12. Therefore, information is preserved between the preliminarily processed and the decoded digital video signals IV and DD.

The encoder and the decoder predictors 107 and 126 may be similar to the encoder and the decoder predictors 57 and 102 operable in accordance with the first predictive function P₁(z).

Referring to FIG. 13, the illustrated circuit can be substituted for a combination of the sub-sampling control circuit 130 and the predictive encoder 56 which is illustrated with reference to FIGS. 10 and 12. In FIG.

13, the illustrated circuit which will be named a combination circuit hereinafter comprises a predictor similar in structure to that illustrated in FIGS. 6 and 7. Accordingly, the predictor is specified by first and second predictors 111 and 112, a detector 113, a register 114, and a switching circuit 115, all of which are identical with the respective elements of FIGS. 6 and 7. As a result, the first and the second preliminary predictive signals $Pd_1$ and $Pd_2$ are selectively supplied through the switching circuit 115 as the predictive signals $PD_1$ to a subtractor 59 responsive to the preliminarily processed signals IV.

The preliminarily processed digital video signals IV are produced by previously processing the input digital video signals DV by the use of the second predictor 112 in the following manner. As described in conjunction with FIG. 7, the second predictor 124 has a total delay equal to the sampling clock periods of 1365. In order to accomplish the interpolation or estimation expressed by Equation (13), five picture elements aa, bb, cc, dd, and ee adjacent to a current picture element xx should be derived in the form of video signals from the input digital video signals DV and delayed relative to the current picture element xx by the sampling clock periods of 1, 681, 682, 683, and 1365, respectively. Since the preliminarily processed digital video signals IV are already delayed during a single sampling clock period, as will presently become clear, the second predictor 112 produces each one of the preliminarily processed digital video signals as a predictor input signal. Further, the second predictor 112 produces, through intermediate terminals 146, 147, 148, and 149, four delayed signals delayed relative to the predictor input signal during the sampling clock periods of 680, 681, 682, and 1364, respectively, together with the second preliminary predictive signal $Pd_2$ delayed by the sampling clock periods of 1365 and delivered to the detector 113. The predictor input signal and four delayed signals are supplied to first, second, third, fourth, and fifth multipliers 151, 152, 153, 154, and 155 which give the weights of 0.5, 0.5, −0.5, 0.25, and 0.25 determined by Equation (13), respectively. Output signals of the respective multipliers 151 through 155 are summed up at an adder 156 to be supplied as a summed signal to a register 157 having a delay equal to one sampling clock period. Thus, a summed and delayed signal is successively produced from the register 157 as an estimated digital video signal estimated for the current one of the input digital video signals DV. From this fact, it is readily understood that the predictor input signal and the four delayed signals correspond to the picture elements aa, bb, cc, dd, and ee, respectively.

The estimated digital video signal is successively supplied together with the input digital video signals to a switching circuit 132 similar in structure and operation to that illustrated in FIG. 12. The illustrated switching circuit 132 sends the combined digital video signals as the preliminarily processed digital video signals IV to the subtractor 59 in a manner described in conjunction with FIG. 12. As a result, the subtractor 59 produces the encoded predictive error signals e in response to the preliminarily processed digital video signals and the predictive signals $PD_1$.

Alternatively, the input digital video signals DV may be thinned out or sub-sampled without the interpolator as shown in FIGS. 12 and 13. In this case, the switching circuit 132 serves to produce the remaining or unthinned digital video signals as the preliminarily processed digital video signals.

Figure 14:
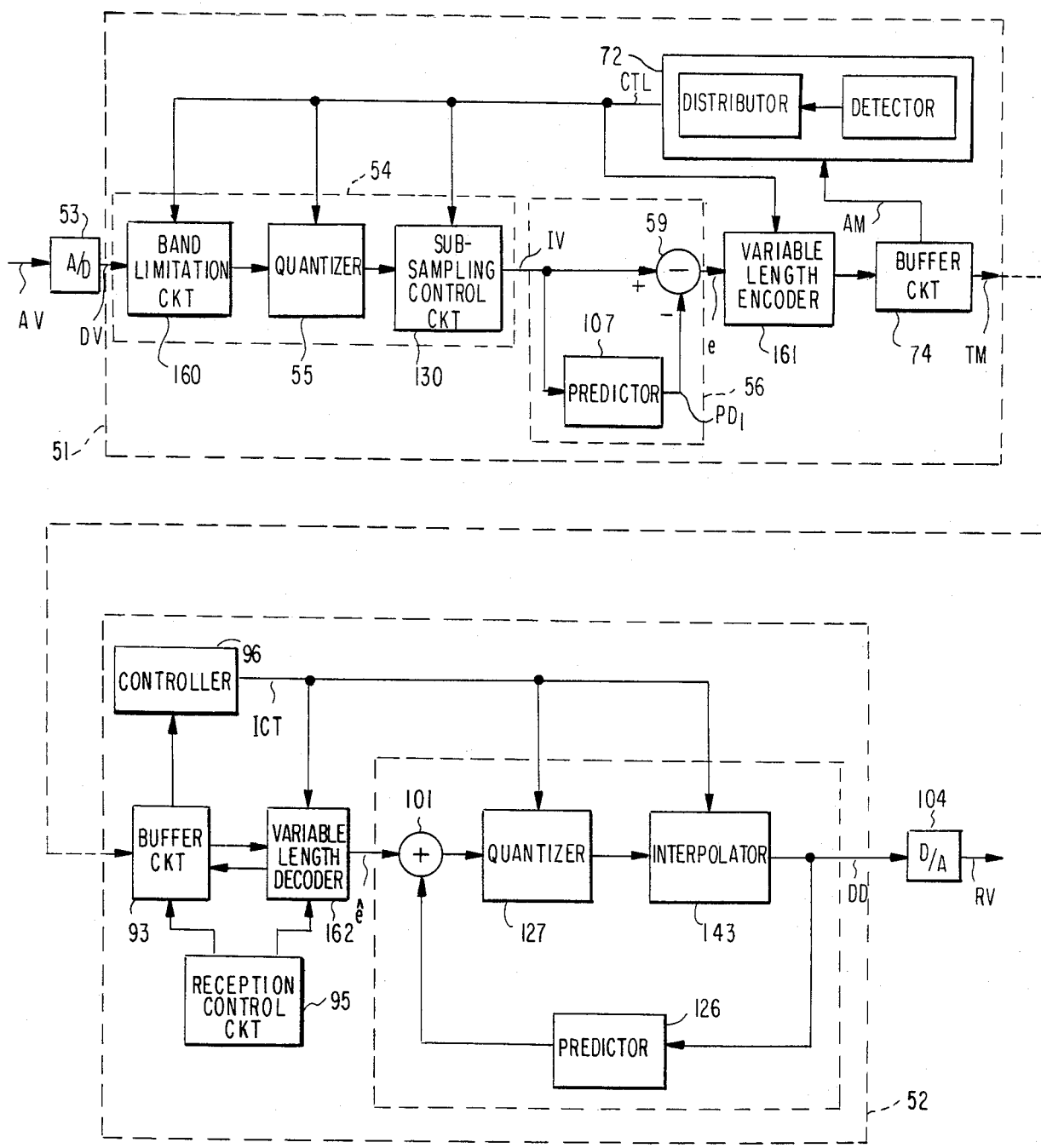
FIG. 14 shows a block diagram of a code communication system including an encoding device according to a third embodiment of this invention.

Referring to FIG. 14, an encoding device 51 according to a third embodiment of this invention is similar in structure to that illustrated with reference to FIG. 10 except that a preliminarily processing circuit 54 comprises a cascade connection of a band limitation circuit 160 (will later be described with reference to FIG. 15), the quantizer 55 of each of FIGS. 1 and 5 and the sub-sampling control circuit 130 of FIG. 12. Briefly speaking, the band limitation circuit 160 is for selectively limiting the input digital video signals DV in a frequency band in accordance with the internal control signal CTL representative of the amount of information stored in the buffer circuit 74. The frequency band is between predetermined lower and higher edges. In other words, the band limitation circuit 160 has a plurality of band limitation characteristics and the frequency band is varied in accordance with a selected one of the band limitation characteristics specified by changeable transfer functions.

In this structure, three circuits of the preliminary processing circuit 54 should be controlled by the internal control signal CTL, depending on or correlatively with one another. Therefore, the control circuit 72 should comprise a detector for detecting the amount of information from the amount signal AM and a distributor for distributing the internal control signal CTL to predetermined one or ones of the three circuits with reference to the result of detection. Each of the characteristics of the three circuits may be indicated or changed by the internal control signal CTL.

In FIG. 14, the input digital video signals DV are allowed to pass through the band limitation circuit 160, the quantizer 55, and the sub-sampling control circuit 130 in order. Thus, the band limitation circuit 160 and the sub-sampling circuit 130 constitutes a first-stage and a last-stage circuit of the preliminary processing circuit 54, respectively. The input digital video signals may be selectively or correlatively subjected to band limitation, quantization, and thinning-out in response to the internal control signal CTL as mentioned above, by the circuits of the preliminarily processing circuit 54. At any rate, the preliminarily processed digital video signals IV are sent to the predictive encoder 56 which comprises the predictor 107 illustrated in FIGS. 6 and 7 and produces the encoded predictive error signals e with reference to the predictive signals $PD_1$ produced in accordance with the selected predictive functions $P_2(z)$ and $P_3(z)$.

Responsive to the internal control signal CTL, a variable length encoder 161 encodes the encoded predictive error signals e into the preliminary variable length codes after processing the encoded predictive error signals e in accordance with the internal control signal CTL, as described with reference to FIGS. 1, 5, and 10. If the input digital video signals DV are subjected to the band limitation, such processing is carried out in a band limited manner. In addition, when one of the sub-sampling characteristics is selected by the internal control signal CTL, the preliminary variable length codes VLC are produced from the variable length encoder 161 and stored in the buffer circuit 74 only when the unthinned picture elements appear as the encoded predictive error signals e.

Thus, the stored codes are transmitted at the transmission rate to a decoding device 52 as the transmission variable length codes TM accompanying the transmission control signal. The transmission control signal is similar to the internal control signal CTL for putting the preliminarily processing circuit 54 into operation in accordance with the amount of information stored in the buffer circuit 74.

Further referring to FIG. 14, a decoder 52 which cooperates with the illustrated encoder 51 comprises similar parts designated by like reference numerals. Under control of the reception control circuit, the transmission variable length codes are stored in the buffer circuit 93 and the transmission control signal is delivered to the control circuit 96. The control circuit 96 produces the inner control signal ICT in a manner similar to the control circuit 72. Responsive to the inner control signal ICT, a variable length decoder 162 decodes the read out variable length codes into the decoded predictive error signals ê.

The decoded predictive error signals ê are supplied to the predictive decoder 100 comprising a quantizer 127 connected to the adder 101 and an interpolator 143 connected to the quantizer 127 and the decoder predictor 126. The quantizer 127 and the interpolator 143 are identical with those illustrated in FIG. 8 and FIG. 10, respectively, and are operated in response to the inner control signal ICT in manners described before.

Thus, the decoded digital video signals DD are produced from the predictive decoder 52 as the reproductions of the preliminarily processed digital video signals IV.

In the illustrated code communication system, a combination of the band limitation circuit 160, the quantizer 55, and the sub-sampling control circuit 130 is used as the preliminarily processing circuit 54. By the use of such a combination, a reduction of the picture quality becomes visually unperceptible in spite of a decrease of an amount of information stored in the buffer circuit 74. This is because fix or adaptive control is possible in consideration of the visual characteristic. For example, the band limitation or the sub-sampling operation may preferentially be carried out at that portion of a picture which includes a low frequency component while the quantization may preferentially be carried out at a portion including a high frequency component.

The order of three circuits may be changed to another order. Two circuits selected from the band limitation circuit, the quantizer, and the sub-sampling circuit may be combined with each other and used as the preliminarily processing circuit 54.

Referring to FIG. 15, the band limitation circuit 160 illustrated in FIG. 14 comprises a first filter part 166 and a second filter part 167 connected in cascade to the first filter part 166. The first filter part 166 comprises a first digital filter 168 having a first transfer function $H_A(z)$ given by:

$$H_A(z) = 1 - (0.5z^{-1} + z^{-3} - 0.5z^{-4}). \qquad (14)$$

The first transfer function $H_A(z)$ shows that the first digital filter 168 has a first frequency pass band in a horizontal direction of a picture.

Responsive to the input digital video signal DV, the first digital filter 168 produces first filter output signals falling within the first frequency pass band. The first filter output signals are sent to a first attenuator 169 controllable by a first attenuation control signal representative of a first attenuation factor $k_A$ ($0 \leq k_A \leq 1$). The first attenuation factor $k_A$ is determined by the internal control signal CTL in a manner to be described later. At any rate, the filter output signals are multiplied by the first attenuation control signal at the first attenuator 168 to produce first attenuated signals equal to $k_A$ time the filter output signals. This means that a frequency pass band of the first attenuator 169 becomes equal to $k_A$ time the first frequency pass band.

A first subtractor 171 subtracts the first attenuated signals from the input digital video signals DV to produce first band limited signals which has a limited frequency band in the horizontal direction. Thus, the first filter part 166 serves to limit the frequency band of the input digital video signals DV in the horizontal direction.

The first band limited signals are impressed on the second filter part 167. The second filter part 167 comprises a second digital filter 172 having a second transfer function $H_B(z)$ given by:

$$H_B(z) = 1 - z^{-2nH}, \qquad (15)$$

where $n_H$ is equal to 682.5 when $f_s = 3f_{sc}$. From Equation (15), it is understood that the second digital filter 172 has a second frequency pass band in a vertical direction of the picture. Responsive to the first band compressed signals, the second digital filter 172 produces second filter output signals falling within the second pass band. The second filter output signals are sent to a second attenuator 174 controllable by a second attenuation control signal representative of a second attenuation factor $k_B$ ($0 \leq k_B \leq 1$). Like the first attenuation factor $k_A$, the second attenuation factor $k_B$ is determined by the internal control signal CTL in a manner to be described presently. The second attenuator 174 produces second attenuated signals resulting from multiplying the second attenuation control signals by the second filter output signals. Thus, the second attenuated signals falls within a frequency band determined by the second attenuation factor $k_B$ and the second transfer function $H_B(z)$ expressed by Equation (15).

A second subtractor 175 subtracts the second attenuated signals from the first band compressed signals to produce, as output compressed signals, second band limited signals which has a limited frequency band in the vertical direction. Thus, the illustrated band compression circuit 160 is specified by the following transfer function $H'(z)$:

$$H'(z) = (1 - k_A(1 - 0.5z^{-1} - z^{-3} + 0.5z^{-4})) \times (1 - k_B(-131z^{-1365})). \qquad (16)$$

From Equation (16), it appears that the input digital video signals DV are subjected to no band limitation when both of the first and the second attenuation factors $k_A$ and $k_B$ are equal to 0. In this case, the first and the second band limited signals are not limited in their frequency bands. On the other hand, when both factors $k_A$ and $k_B$ approximate 1, the band limitation circuit 160 passes through frequency components having frequencies which are near to 0 and the subcarrier frequency $f_{sc}$ and which are near to an integral multiple of $f_H/2$, where $f_H$ represents the horizontal scanning frequency.

As is apparent from Equation (16), the transfer function $H'(z)$ may be regarded as defining a plurality of selectable transfer functions because the frequency band is variable in accordance with the change of the first and/or the second attenuation factors $k_A$ and $k_B$. In other words, the higher and the lower edges of the frequency band are changed to provide a plurality of successive frequency bands in cooperation with the selectable transfer functions. Each of the output signals of the band limitation circuit is made to have a processed frequency in a selected one of the successive frequency bands that is defined by the selected transfer function.

Now, the first and the second factors $k_A$ and $k_B$ are determined by the internal control signal CTL. In other words, band limitation characteristics of the band limitation circuit 160 are specified by the first and the second factors $k_A$ and $k_B$. In order to determine the both factors $k_A$ and $k_B$ from the internal control signal CTL, a characteristic decision circuit 178 is attached to the first and the second attenuators 169 and 174. The characteristic decision circuit 178 comprises a detector 179 for detecting the internal control signal CTL, a selector 181 for selecting one of the band limitation characteristics in accordance with the result of detection to determine values of the factors $k_A$ and $k_B$, and a distributor 182 for distributing the first and the second attenuation factor signals to the first and the second attenuators 169 and 174 with reference to the sampling clock CK. The distributor 182 can distributes both of the factors $k_A$ and $k_B$ simultaneously or individually.

The band limitation may be carried out about those locations of each picture which are specified by appearance of the factors $k_A$ and $k_B$. At this time, it may be said that spatial frequencies are changed in a space determined by each picture. When the band limitation is successively made about predetermined ones of locations that successively appear, it may be said that frequencies are changed with time. Such operation is also possible by repeatedly producing the factors $k_A$ and $k_B$ at the predetermined locations by the use of the characteristic decision circuit 178.

Figure 16:
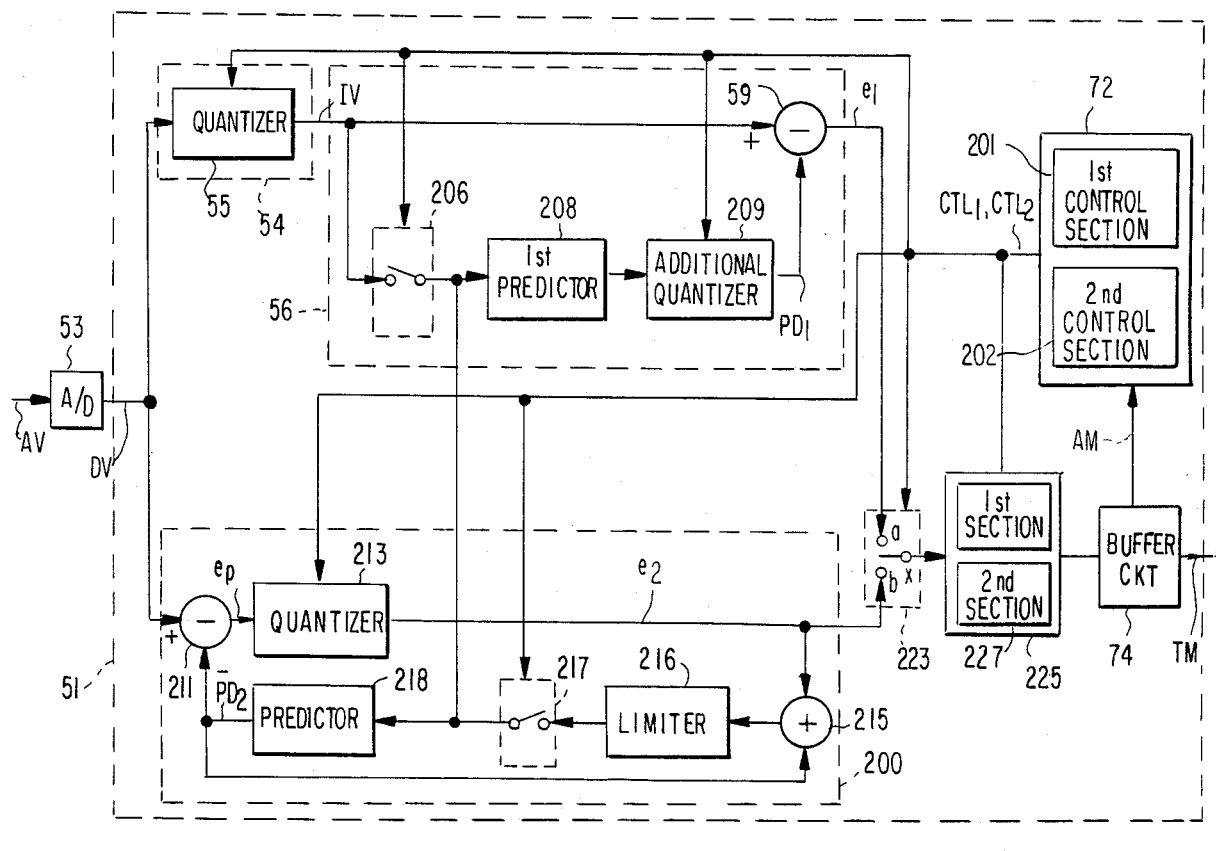
FIG. 16 shows a block diagram of a code communication system including an encoding device according to a fourth embodiment of this invention.
Figure 16:
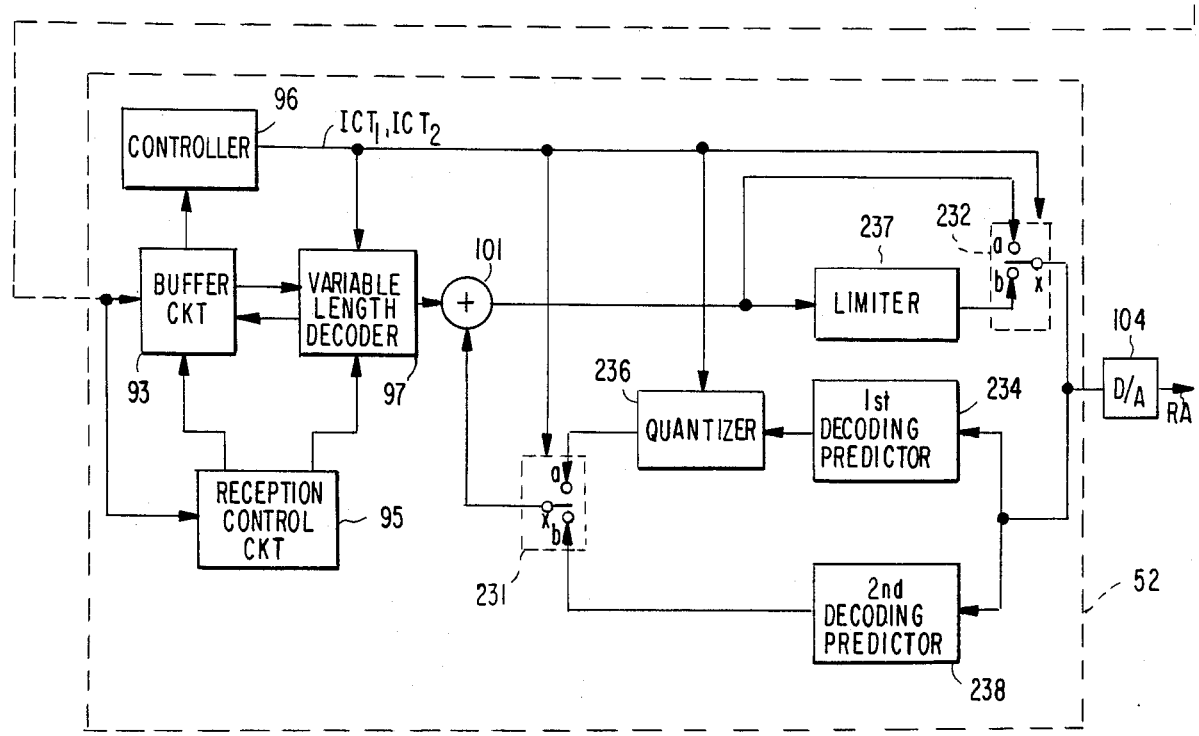

Referring to FIG. 16, an encoding device 51 according to a fourth embodiment of this invention comprises similar parts designated by like reference numerals. Herein, it is assumed that the analog-to-digital converter 53 is supplied as an analog signal AV with the NTSC color television signals and the analog signal AV is sampled by the use of the sampling frequency $f_s$ equal to three times the subcarrier signal frequency. Further, it is assumed that the analog-to-digital converter 53 produces each digital signal of eight bits at a sampling point as a result of the analog-to-digital conversion. Each digital signal of eight bits is successively supplied to the encoding device 51 as the input digital video signal DV.

In addition to the predictive encoder 56 (will be called a non-recursive or a first encoder) similar to that illustrated with reference to FIG. 1, the illustrated encoding device 51 comprises a predictive encoder 200 of a recursive or DPCM type (will be referred to as a recursive or a second encoder).

The first and the second encoders 56 and 200 are controlled by the controller 72 to be selectively operated in a manner described below. The controller 72 is coupled to the buffer circuit 74 to receive the amount signal AM representative of an instantaneous amount of information stored in the buffer circuit 74, as are the cases with the other encoding devices. The amount of information is classified into first, second, third, and fourth grades. The first grade is representative of the greatest amount while the fourth grade, the smallest amount. Thus, higher grades represent smaller amounts. Such fourth grades can be expressed by two bits of the amount signal.

Responsive to the amount signal AM, the controller 72 comprises a first control section 201 for producing a first control signal $CTL_1$ when the amount signal AM is representative of either the third or the fourth grade. The third and the fourth grades can be distinguished from each other by the first control signal $CTL_1$. In addition, the first control signal $CTL_1$ serves to select the first encoder 56. Such distinction and selection is possible by the use of two bits of the first control signal $CTL_1$ one of which specified each grade and the other of which is representative of the selection of the first encoder 56. Thus, the first control signal $CTL_1$ appears when the instantaneous amount is less than preselected reference amount given by the second grade.

The controller 72 also produces a second control signal $CTL_2$ when the amount signal is representative of either the first or the second grade. The second control signal $CTL_2$ is helpful to specify each of the first and the second grades. Such operation is also possible by the use of two bits of the second control signal $CTL_2$.

From the above, it is readily understood that the first control signal $CTL_1$ appears when the amount of information is smaller than that given by the second grade and, otherwise, the second control signal $CTL_2$ appears.

In FIG. 16, the input digital video signals DV are supplied to the first encoder 56 through the quantizer 55 operable as the preliminarily processing circuit 54 and direct to the second encoder 200.

Temporarily referring to FIG. 17, the quantizer 55 is similar to that illustrated with reference to FIG. 3 except that eight bits $x_1$ through $x_8$ of each input digital video signals DV is quantized into either eight bits $y_1$ through $y_8$ or seven bits $y_2$ through $y_8$ of each quantized signal supplied as the intermediate digital video signals IV. The symbols $x_1$ and $x_8$ are representative of the least and the most significant bits of the input digital video signals DV, respectively, and the symbols $y_1$ and $y_8$, the least and the most significant bits of the intermediate digital video signals IV, respectively. The more significant bits $x_2$ through $x_8$ except the least significant bit $x_1$ directly appear as the more significant bits $y_2$ through $y_8$ while the least significant bit $x_1$ is produced through an AND gate 202 as the least significant bit $y_1$. Thus, connections between the more significant bits $x_2$ through $x_8$ and $y_2$ through $y_8$ and the AND gate 202 serve to quantize the input digital video signals DV into the quantized digital video signals. An inverter 203 is responsive to an internal control signal CTL similar to that described in connection with FIG. 1 and makes the AND gate produce, as the intermediate digital video signals IV, the quantized signals each of which has either eight or seven bits. Specifically, when a bit signal QS of the first control signal $CTL_1$ takes the logic "1" level, the quantized signal has eight bits and, otherwise, the quantized signal has seven bits. From this fact, it is readily understood that the quantizer 55 has two of quantization characteristics and either one of them is selected by the internal control signal CTL.

Prior to description of the second encoder 200, the first encoder 56 is supplementarily described below. The first encoder 56 comprises a first predictor 208 coupled to the quantizer 55 through a first switch 206 controlled by the first control signal $CTL_1$. The first predictor 208 is operable in accordance with a fourth predictive function $P_4(z)$ given by:

$$P_4(z) = z^{-262nH}, \tag{17}$$

where $n_H$ is representative of the number of samples appearing during a single horizontal time interval and is equal to 682.5 when $f_s = 3f_{sc}$. This means that the first predictor 208 carries out field prediction. Such first predictor 208 is similar to the second predictor 112 in structure and used as a shift register having a delay equal to the sampling clock periods of 178815 (=262 $n_H$), in place of the shift register 124 having the delay equal to the sampling clock periods of 1365.

An additional quantizer 209 is connected between the first predictor 208 and the subtractor 59 and has the same structure as the quantizer 55. The additional quantizer 209 is operable in a manner similar to the quantizer 91 shown by the broken line in FIG. 1. Responsive to the first control signal $CTL_1$, the quantizer 55 and the additional quantizer 208 concurrently switches the quantization characteristics from one to the other. Therefore, noncoincidence of the quantization step sizes never takes place between the encoding device 51 and a decoding device 52 (will be described later) even on switching the quantization characteristics. Thus, the additional quantizer 209 produces first predictive signals $PD_1$. At any rate, the first encoder 56 produces first encoded predictive error signals $e_1$ with reference to the first predictive signals $PD_1$ in a manner described in conjunction with FIG. 1 when the first control signal $CTL_1$ appears from the controller 72.

The second encoder 200 comprises a subtractor 211 for subtracting feedback signals from the input digital video signals to produce second predictive error signals $e_P$ and a nonuniform quantizer 213 having a plurality of selectable nonuniform quantization characteristics for nonuniformly quantizing the second predictive error signals $e_P$ into second quantized or encoded error signals $e_2$ in accordance with the selected nonuniform characteristic specified by the second control signal $CTL_2$. With this nonuniform quantizer 213, it is possible to select two kinds of the quantization characteristics which are represented by first and second companding laws A and B. The first and the second companding laws, namely, nonuniform encoding rules A and B define fifteen and thirty-one levels, respectively, and are given by:

A: 0-2-2-4-6-8-12-16 and
B: 0-2-2-2-2-4-4-4-4-8-8-8-8-8-8-8, respectively. The fifteen and the thirty-one levels according to the first and the second companding laws A and B can be expressed by four and five bits. Incidentally, negative levels are omitted from the first and the second companding laws A and B mentioned above. Either one of the first and the second companding laws A and B is selected by the second control signal $CTL_2$. Thus, the nonuniform quantizer 213 produces the second encoded error signals $e_2$ in accordance with the selected compandiing law A or B.

The second encoded error signals $e_2$ and the feedback signals are summed up at an adder 215 to produce sum signals as local decoded signals. The local decoded signals are given supplied through a limiter 216 to a second switch 217 controlled by the second control signal $CTL_2$. The limiter 216 serves to limit the local decoded signals in amplitudes so that integral parts of the local decoded signals coincide in bit number with those of the preliminarily processed digital video signals IV. During presence of the second control signal $CTL_2$, the local and limited decoded signals are supplied through the second switch 217 to a second predictor 218 for producing second predictive signals $PD_2$. The second predictive signals $PD_2$ are delivered to the subtractor 211 and the adder 215 as the feedback signals described before. The second predictor 218 is operable in accordance with the second predictive function $R_2(z)$ expressed by Equation (8). This means that prediction is implemented one dimensionally in every frame. Therefore, the second predictor 218 has the same structure as the first predictor 111 illustrated with reference to FIG. 7.

The first and the second encoded predictive error signals $e_1$ and $e_2$ are supplied to a third switch 223 for selectively delivering the first and the second encoded predictive error signals $e_1$ and $e_2$ in response to the first and the second control signals $CTL_1$ and $CTL_2$, respectively.

A variable length encoder 225 is coupled to the third switch and comprises first and second encoder section 226 supplied with the first and the second encoded predictive error signals $e_1$ and $e_2$, respectively, through the third switch 223.

The first encoder section 226 has encoding characteristics for the first encoded predictive error signals $e_1$ and encodes the first encoded predictive error signals $e_1$ into first variable length codes in compliance with one of the encoding characteristics in a manner described with reference to FIG. 4. More specifically, when the bit signal QS of the first control signal $CTL_1$ (shown in FIG. 17) takes the logic "0" level, the first encoder section 226 is supplied with the first encoded predictive signals $e_1$, each of which has a precision or a quantization step defined by eight bits. The precision corresponds to the quantization characteristic selected by the bit signal QS. The number of the variable length codes is equal to 256 in correspondance to eight bits of each first encoded predictive error signals $e_1$. Herein, each of the first encoded predictive error signals can take a selected one of the levels between -128-level and 127-level, 0-level inclusive. On the other hand, when the bit signal QS takes the logic "1" level, each of the first encoded predictive error signals $e_1$ is expressed with a precision of seven bits. This means that each first encoded predictive error signal $e_1$ takes a selected one of levels equal in number to 128 and selected from -128-level and 126-level, 0-level inclusive. It is assumed here that only even number levels are selected on appearance of the logic "1" level of the bit signal QS.

Thus, the first encoder section 226 has two of the encoding characteristics selected by eight and seven bits of the first encoded predictive error signals $e_1$ and produces first variable length codes as the preliminary variable length codes in the above-mentioned manner. The selected one of the encoding characteristics is determined in consideration of an instantaneous amount represented by the first control signal $CTL_1$. It is mentioned here that the first encoded predictive error signals $e_1$ may given by a bit number more than eight bits. Even when the more significant bits higher than eight bits may be omitted from the first encoded error signals $e_1$ by carry out calculation to modulus 256 and, thereafter, code conversion is implemented with respect to the first encoded predictive signals, reproduction can correctly be carried out.

The second encoder section 227 has additional encoding characteristics corresponding to the first and the second companding characteristics. A first one of the additional encoding characteristics is for encoding the second encoded predictive error signals into fifteen kinds of equal length codes, each having four bits, while a second one is for encoding the second encoded predictive error signals into thirty-one kinds of variable length codes. Such an equal length code may be considered as a sort of various variable length codes. Supplied with the second control signal $CTL_2$, the second encoder section 227 encodes the second encoded predictive error signals $e_2$ in compliance with one of the second encoding characteristics that is selected at each instant in consideration of the instantaneous amount represented by the second control signal $CTL_2$. When the first companding law A is selected at the nonuniform quantizer 213, the first additional encoding characteristic is selected by the second control signal $CTL_2$ to produce one of the equal length codes that corresponds to each second encoded predictive error signals $e_2$. On the other hand, when the nonuniform quantizer 213 is put into operation in accordance with the second companding law B, the second encoder section 227 produces one of the thirty-one kinds of the variable lengths codes in response to each second encoded predictive error signal $e_2$. In any event, the equal and the variable length codes are produced from the second encoder section 227 as second variable length codes which appear as the preliminary variable length codes.

When the nonuniform quantizer 213 is used for quantization, a quantization noise inevitably takes place and results in an overflow error on calculation. In order to avoid this overflow error, at least one extra bit should be added to a most significant bit of each predictive error signal $e_2$ as a higher significant bit or bits. Preferably, calculation is carried out in each portion of the illustrated encoding device 51 on condition that the bit number of an integral part is equal to nine.

Let the first control signal $CTL_1$ be produced from the controller 72. At this time, the first switch 206 connects the quantizer 55 to the first predictor 208. The preliminary processed digital video signals (may be simply called preliminary signals) IV are delivered not only to the first predictor 208 but also the second predictor 218. On the other hand, when the second switch 217 is closed in response to the second control signal $CTL_2$, the local decoded signals are also delivered to both of the first and the second predictors 208 and 217. Accordingly, both of the first and the second predictors 208 and 217 are supplied with the same input signals. Hence, it is possible to continuously carry out encoding operation even on switching the first and the second encoders 56 and 200.

Thus, the preliminary variable length codes including the first and the second variable length codes are successively stored as the buffer input codes in the buffer circuit 74 in accordance with the first and the second control signals $CTL_1$ and $CTL_2$. The stored input codes are produced at the predetermined transmission rate as the transmission variable length codes TM. The transmission control signal which is similar to each of the first and the second control signals is also produced from the buffer circuit 74 together with the transmission variable length codes and the unique word serving for a synchronization signal.

A decoding device 52, which is for use in combination with the illustrated encoding device 51, comprises similar parts designated by like reference numerals. Therefore, the transmission variable length codes are successively stored in the buffer circuit 93 and the transmission control signal is delivered to the controller 96 under control of the reception control circuit 95. Responsive to the transmission control signal, the controller 96 produces first and second inner control signals $ICT_1$ and $ICT_2$ representative of reproductions of the first and the second control signals $CTL_1$ and $CTL_2$, respectively. The variable length decoder 97 has two decoding characteristics for the first variable length codes and two additional decoding characteristics for the second variable length codes. Responsive to the first inner control signal $ICT_1$, the variable length decoder 97 decodes the transmission variable length codes (will be called read out codes) read out of the buffer circuit 93 to supply the adder 101 with first decoded predictive error signals ê in compliance with one of the decoding characteristics. The first decoded predictive error signals ê are representative of reproductions of the first encoded predictive error signals $e_1$ produced from the first encoder 56.

Supplied with the first control signal $CTL_1$, first and second transfer switches 231 and 232, each of which has a switch terminal x and a pair of terminals a and b, connect the switch terminals x to the terminals a, respectively. As a result, the adder 101 is connected through the second transfer switch 232 to a first decoding predictor 234 similar in structure to the first predictor 208 and operable in accordance with the fourth predictive function $P_4(z)$ expressed by Equation (17). The first decoding predictor 234 sends first decoder predictive signals through a decoder quantizer 236 and the first transfer switch 231 to the adder 101. The decoder quantizer 236 has the same quantization characteristics as the quantizer 55 and the additional quantizer 209 located in the first encoder 56. The quantization characteristics of the decoder quantizer 236 are switched from one to the other in response to a predetermined bit signal of the first inner control signal $ICT_1$. Thus, the adder 101 produces, as first decoded signals, the decoded digital video signals DD which are reproductions of the preliminary processed digital video signals IV. Therefore, information is preserved between the preliminary processed and the decoded digital video signals IV and DD.

Stated otherwise, when the second inner control signal $ICT_2$ is produced from the controller 96, the first and the second transfer switches 231 and 232 connect the switch terminals x to the terminal b. At this time, the adder 101 is connected through a decoder limiter 237 to a second decoding predictor 238 operable in compliance with the second predictive function $P_2(z)$, as is the case with the second predictor 213 illustrated in FIG. 16. The limiter 237 serves to limit output signals of the adder 101 to eight bits. Under these circumstances, the variable length decoder 97 decodes the read out signals into second decoded predictive error signals ê in accordance with one of the additional decoding characteristic that is indicated by the second control signal $CTL_2$. Such an indication is given by a specific one bit of the second inner control signal $ICT_2$ that is determined by the instantaneous amount.

The second decoded predictive error signals ê are added by the adder 101 to second decoder predictive signals produced from the second decoding predictor 238. Thus, the adder 101 supplies the limiter 237 with second decoded signals, each having 9 bits. The limiter 237 limits the second decoded signals in amplitudes so that each integral part of the second decoded signals becomes 8 bits.

The second decoded signals are sent to the digital-to-analog converter 104 as the decoded digital video signals DD and are converted into the reproduced analog video signals RA by the digital-to-analog converter 104. When the second encoder 200 are used together with circuit elements of the decoding device 52 are operable in cooperation with the second encoder 200, information carried by the input digital video signals DV is not preserved in the second decoded signals because of the nonuniform quantizer 213.

In addition, each of the first predictor 208 and the first decoding predictor 234 may be replaced by the predictor 107 illustrated with reference to FIG. 6.

Figure 18:
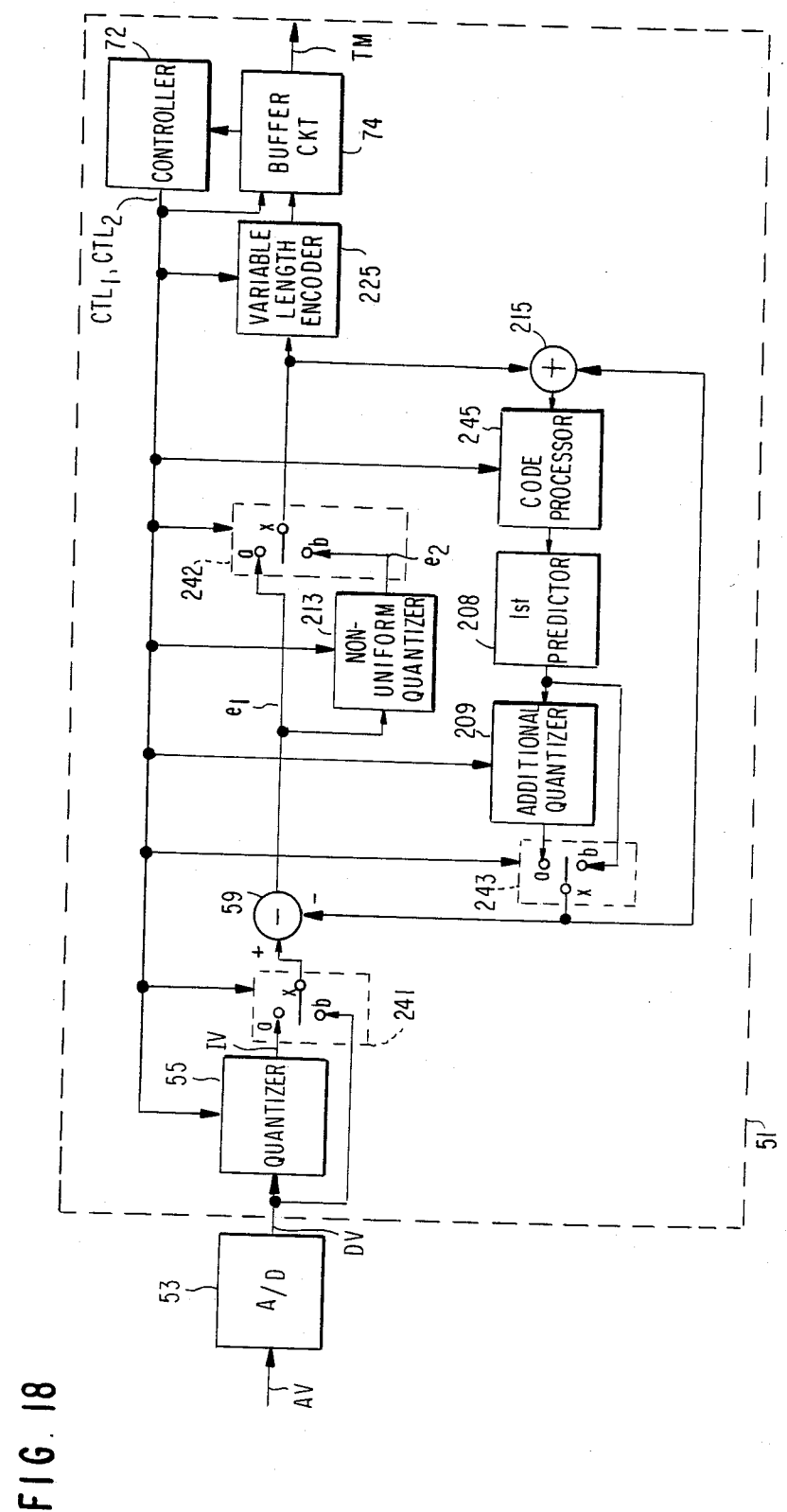
FIG. 18 shows a block diagram of an encoding device according to a fifth embodiment of this invention.

Referring to FIG. 18, an encoding device 51 according to a fifth embodiment of this invention comprises similar parts designated by like reference numerals and characters shown in FIG. 16. Briefly speaking, the illustrated encoding device 51 is for commonly using the first predictor 208 in the first and the second encoders 56 and 200 both of which are clearly illustrated in FIG. 16. Although not apparent from this figure, both of the first and the second encoders will become clear as description proceeds. For the purpose of the common use of the first predictor 208, each of first, second, and third encoder switches 241, 242, and 243 has a switching terminal x and first and second terminals a and b.

As shown in FIG. 18, the first encoder switch 241 is connected to the quantizer 55 and the analog-to-digital converter 53 at the first and the second terminals a and b thereof, respectively. The second switch 242 is connected to the adder 101 and the nonuniform quantizer 213 at the first and the second terminals thereof, respectively. The third switch 243 is connected to the quantizer 209 and to the first predictor 208.

The controller 72 produces the first and the second control signals $CTL_1$ and $CTL_2$ in a manner described in conjunction with FIG. 16. Therefore, the first control signal $CTL_1$ indicates operation of the first encoder and specifies characteristics to be selected in the quantizer 55, the additional quantizers 209, and the variable length encoder 225, as mentioned in connection with FIG. 16. Likewise, the second control signal $CTL_2$ indicates operation of the second encoder and specifies characteristics to be selected in the nonuniform quantizer 213.

Each of the first and the second control signals $CTL_1$ and $CTL_2$ appear in compliance with the amount of information stored in the buffer circuit 74 instantaneously or at a predetermined period, for example, the horizontal scanning period.

On production of the first control signal $CTL_1$, the switching terminal x is connected to the first terminal a in each of the first, the second, and the third encoder switches 241, 242, and 243. As a result, the input digital video signals DV are supplied through the quantizer 55 and the first encoder switch 241 to the subtractor 59 as the preliminary processed digital video signals IV. The subtractor 59 is supplied from the additional quantizer 209 with first predictive signals $PD_1$ similar to those illustrated in FIG. 16, as will become clear later. The subtractor 59 produces the first encoded predictive error signals $e_1$ by subtracting the first predictive signals $PD_1$ from the preliminary processed digital video signals IV. The first encoded predictive error signals $e_1$ are supplied through the second encoder switch 242 to the variable length encoder 225 and encoded into the first variable length codes in a manner described in conjunction with FIG. 16. The first variable length codes are stored as the buffer input codes in the buffer circuit 74 and successively produced as the transmission variable length codes accompanied by the transmission control signal and the unique word.

The first encoded predictive error signals $e_1$ are supplied to the adder 215 together with the first predictive signals $PD_1$. The adder 215 sums up the first encoded predictive error signals $e_1$ and the first predictive signals $PD_1$ to produce, as the local decoded signals, sum signals, respectively. It should be noted here that the sum signals are similar to the preliminary processed digital video signals IV because the first encoded predictive error signals $e_1$ result from subtractions of the preliminary processed signals IV from the first predictive signals $PD_1$. Practically, each of the local decoded signals has 9 bits in consideration of the overflow error which takes place on using the second or recursive encoder. The most significant bit of each local decoded signals is useless during operation of the non-recursive encoder. To this end, the most significant bit (MSB) is omitted from each local decoded signal by a code processor 245 operated in response to the first control signal $CTL_1$. Such omission of the MSB is not adversely affected because the adder 215 carries out calculation to modulus 256.

Thus, the sum signals, each of which has 8 bits and identical with each preliminary processed digital video signal, are supplied through the first predictor 208 to the additional quantizer 209. The additional quantizer 209 delivers the first predictive signals $PD_1$ through the second encoder switch 243 to the subtractor 59 and the adder 215. From this fact, it is readily understood that the first or non-recursive encoder is formed during presence of the first control signal $CTL_1$ by connecting the switching terminal x of each encoder switch to the first terminal a thereof.

On production of the second control signal $CTL_2$, the switching terminal x is connected to the second terminal b in each of the first, the second, and the third encoder switches 241, 242, and 243. Consequently, the subtractor 59 is directly supplied with the input digital video signals DV and with the second predictive signals $PD_2$ produced from the first predictor 208. Coupled to the subtractor 59, the nonuniform quantizer 213 delivers the second encoded predictive error signals $e_2$ through the second encoder switch 242 to the variable length encoder 225 and to the adder 215. The variable length encoder 225 produces the second variable length codes in response to the second control signal $CTL_2$ in a manner described before.

The adder 215 sums up the second encoded predictive error signals $e_2$ and the second predictive signals $PD_2$ to produce the local decoded signals, each having 9 bits. Responsive to the second control signal $CTL_2$, the code processor 245 keeps the local decoded signals intact. At this time, the MSB of each local decoded signal serves as a sign bit. Supplied with the above-mentioned local decoded signals, the first predictor 208 delivers the second predictive signals $PD_2$ through the third encoder switch 243 to the subtractor 59 and the adder 215. Thus, the encoding device 51 is operable as the second or recursive encoder comprising the nonuniform quantizer 213.

At any rate, the transmission variable length codes TM are produced from the encoding device 51 together with the unique word and the transmission control signal similar to that described with reference to FIG. 16.

Figure 19:
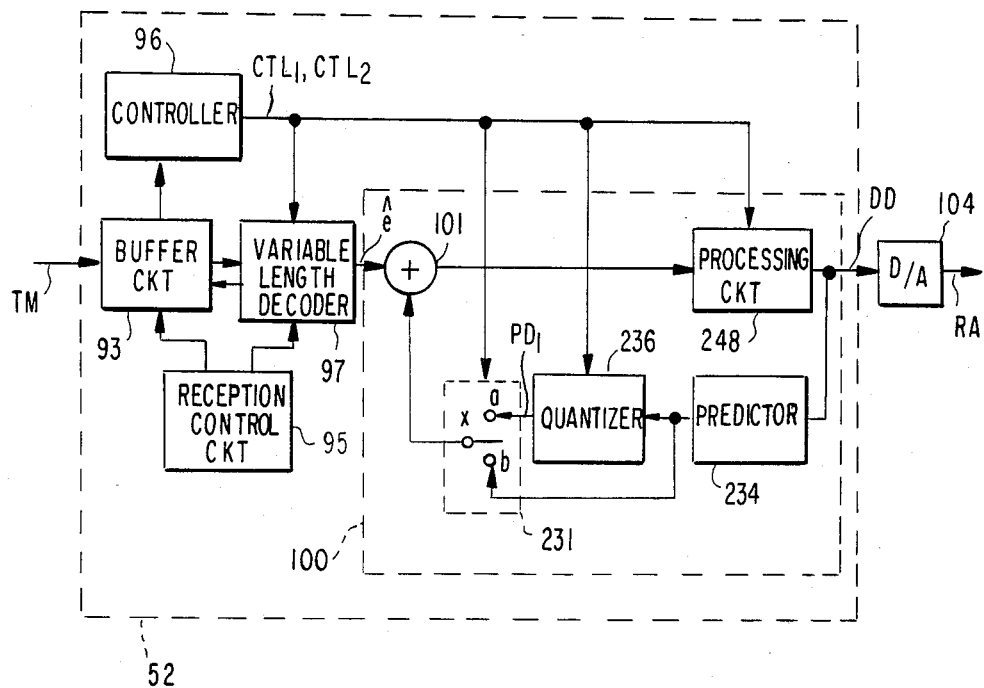
FIG. 19 shows a block diagram of a decoding device for use in combination with the encoding device illustrated in FIG. 18.

Referring to FIG. 19, a decoding device 52 is for use in combination with the encoding device 51 illustrated in FIG. 18 and operable in response to the transmission variable length codes TM, the transmission control signal, and the unique word produced from the encoding device 52. The transmission variable length codes and the transmission control signal are delivered to the buffer circuit 93 and the controller 96 under control of the reception control circuit 95. Like in FIG. 16, the first and the second inner control signals $ICT_1$ and $ICT_2$ are produced from the controller 96. The variable length decoder 97 supplies the decoded predictive error signals ê to a predictive decoder 100 in a manner similar to that described with reference to FIG. 16. The predictive decoder 100 comprises the adder 101, the first decoding predictor 234, and the quantizer 236, as is the case with the decoding device 52 illustrated in FIG. 16. In addition, the decoding device 52 comprises a single decoding switch 231 similar in operation to that illustrated with reference to FIG. 16 and a processing circuit 248 similar in operation to that of FIG. 18.

Responsive to the first inner control signal $CTL_1$, the decoding switch 231 connects the switching terminal x to the first terminal a thereof and the processing circuit 248 is operated to produce the first decoded signals, as is suggested in conjunction with FIG. 18. The first decoded signals, each of which has 8 bits, are supplied to the additional quantizer 236 through the decoding predictor 234 operable in accordance with the same predictive function as the first predictor 208 illustrated in FIG. 18. The additional quantizer 236 quantizes the output signals of the decoding predictor 234 into quantized signals in accordance with one of the quantization characteristics that is specified by the first inner control signal $ICT_1$. The quantized signals are sent as the first predictive signals $PD_1$ through the decoding switch 231. The first decoded signals are supplied as the decoded digital video signals DD to the digital-to-analog converter 104.

Responsive to the second inner control signal $ICT_2$, the switching terminal x of the decoding switch 231 is connected to the second terminal b and the first decoding predictor 234 is connected to the adder 101 through the decoding switch 231. The second decoded signals, which are reproductions of the second encoded signals produced from the recursive encoder, appear from the decoded digital video signals DD.

With the system illustrated in FIGS. 18 and 19, a reduction of the picture quality is avoidable by the use of the recursive encoder when the quantization step becomes coarse in the non-recursive encoder. This is because the visual characteristic can be utilized in the recursive encoder or DPCM, in spite of the fact that loss of information is inevitable in the recursive encoder, as is well known in the art.

Figure 20:
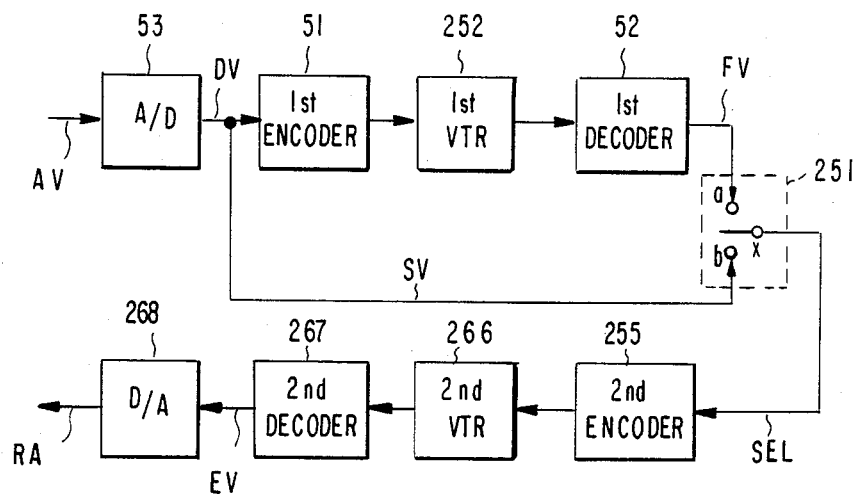
FIG. 20 shows a block diagram of an editing system according to a sixth embodiment of this invention.

Referring to FIG. 20, an editing system according to a sixth embodiment of this invention is for use in combination with the encoding system 51 and the decoding system 52 illustrated with reference to FIG. 1 to edit a sequence of first digital video signals FV and a sequence of second digital video signals SV and to produce a sequence of edited digital video signals EV. It is assumed that the analog-to-digital converter 53 is supplied with sampling clock pulses of a sampling frequency $f_s$ equal to three times the subcarrier frequency $f_{sc}$ and with the NTSC color television signal as the analog video signal AV. The sampling clock pulses therefore have a sampling clock period of $1/10.74 \times 10^{-6}$ (sec). The analog video signal is successively converted into a sequence of samples and the sample sequence is produced from the analog-to-digital converter 53 as a sequence of digital video signals DV shown in FIG. 1. For brevity of description, let each sample be represented by 8 bits. Therefore, the analog-to-digital converter 53 produces the digital video signal sequence at a bit rate determined by the sampling pulses and the bit number of each sample. The digital video signals DV are delivered to the encoding device 51 and a video switch 251 (will later be described). The encoding device 51 will be referred to as a first encoder hereinafter.

The first encoder 51 comprises, as the preliminary processing circuit, a quantizer similar to that illustrated with reference to FIG. 3 or FIG. 17. Herein, it is surmised that the quantizer has four uniform quantization characteristics and can quantize each sample into eight bits, seven bits, six bits, and five bits of the preliminary processing digital video signals in the respective uniform quantization characteristics, respectively. Since such a quantizer can readily be designed with reference to FIG. 3 or FIG. 17, description is therefore omitted about the structure of the quantizer herein. At any rate, the first encoding device 51 produces the transmission variable length codes at the predetermined rate or bit rate in response to the digital video signals DU, as mentioned in conjunction with FIG. 1. The transmission variable length codes may be called first code sequence of transmission codes. The transmission control signal is also produced from the first encoder 51 together with the transmission variable length codes and specifies a selected one of the uniform quantization characteristics that is determined by the amount of information stored in the buffer circuit 74 in the first encoder 51. The transmission control signal may be named a first mode signal representative of a selected one of the quantization characteristic in the first encoder 51 hereinafter because the selected quantization characteristic defines a mode of operation in the quantizer included in the first encoder 51 as the preliminary processing circuit 54.

The transmission variable length codes are once stored in a first digital memory, namely, a first digital video tape recorder 252 and, thereafter, sent to the decoding device 52 which may be referred to as a first decoder.

The first decoder 52, which comprises no digital-to-analog converter 104, produces the decoded digital video signals DD with reference to the inner control signal ICT defined by the transmission control signal, namely, the first mode signal. The decoded digital video signals DD are reproductions of the preliminary processed digital video signals, as described in detail with reference to FIG. 1. The decoded digital video signals are characterized by the quantization characteristics of the quantizer in the first encoder 51 and given as the first digital video signals to the video switch 251. On the other hand, the digital video signals DV are directly given as second digital video signals SV to the video switch 251.

The video switch 251 has a switching terminal x and first and second terminals a and b and is connected to the first decoder 52 and the analog-to-digital converter 53 at the terminals a and b, respectively. The video switch 251 is manually or automatically operated to selectively send the first and the second digital signals FV and SV as selected or coding video signals SEL to a second encoder 255 comprising an element different from the first encoder 51. Description is therefore directed to the second encoder 255 for a while.

Figure 21:
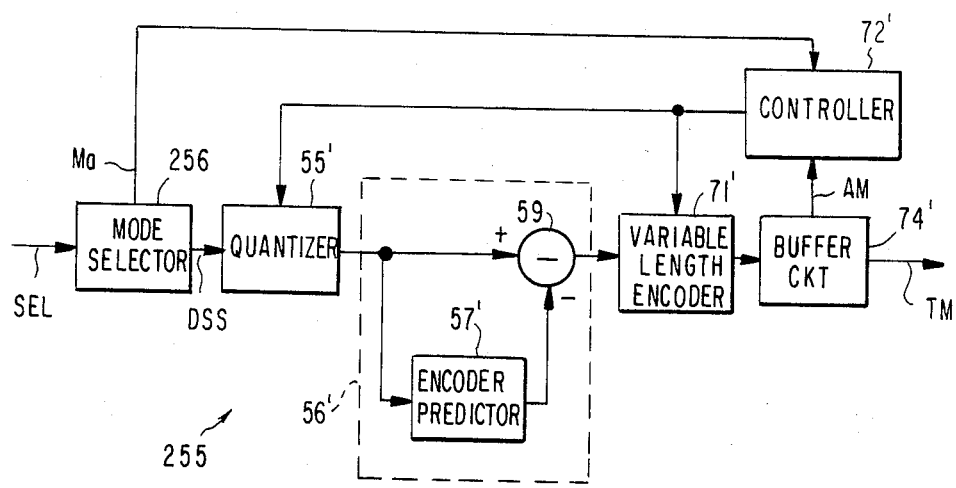
FIG. 21 shows a block diagram of an encoder used in the editing system illustrated in FIG. 20.

Referring to FIG. 21, the second encoder 255 is similar in structure to the first encoder 51 illustrated in FIG.

1 except that a mode selector 256 is supplied with the selected video signals SEL. In FIG. 21, a prime is attached to each element corresponding to that illustrated in FIG. 1. The selected video signals SEL are supplied to the quantizer 55′ through the mode selector 256 which will presently be described with reference to FIG. 22. It should be noted here that the amount of information stored in the buffer circuit 74′ of the second encoder 255 becomes unequal to that in the buffer circuit 74 when the video switch 251 is switched from the second terminal b to the first terminal a. Accordingly, the controller 72′ controls the quantizer 55′ and the variable length encoder 71′ so that noncoincidence of the amount becomes small between the buffer circuit 74′ and 74. Operation of the controller 72′ will become clear as description proceeds. In order to carry out such operation, it is necessary to detect the selected preliminarily processed characteristic.

Figure 22:
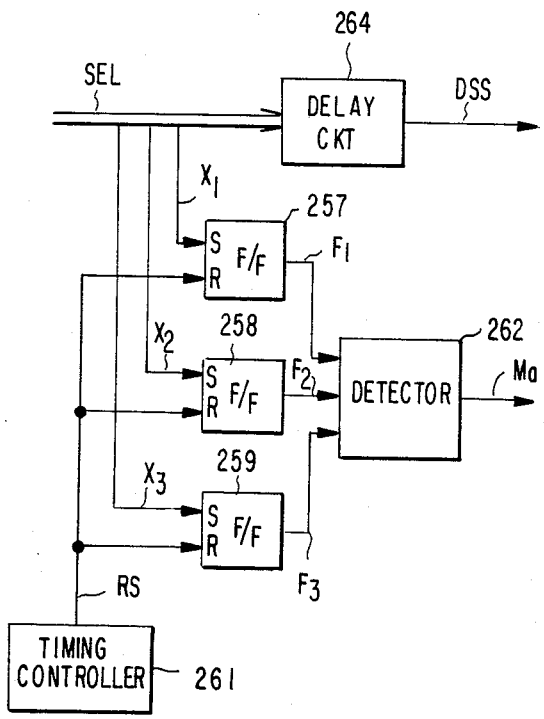
FIG. 22 shows a block diagram of a mode selector used in the encoder illustrated in FIG. 21.

Temporarily referring to FIG. 22, the mode selector 256 is responsive to the selected digital signals SEL for producing a mode signal Ma representative of the selected quantization characteristic without reception of the first mode signal from the first decoder 52. The mode signal Ma may be called a first mode signal. More particularly, the mode selector 256 is supplied at every sample with eight parallel bits of each selected digital signal SEL. Thus, each selected digital signal SEL appears in synchronism with the sampling signal. The mode selector 256 comprises first, second, and third flip flops 257, 258, and 259, each having a set terminal S and a reset terminal R. The least significant bit $X_1$, the least significant bit but one $X_2$, and the least significant bit but two $X_3$ of each selected digital signal SEL are given to the set terminals S of the respective flip flops 257, 258, and 259. Each of the reset terminal R of the flip flops 257, 258, and 259 is supplied with a reset signal from a timing controller 261 at a predetermined time interval, for example, the horizontal scanning period. This means that a code length of each selected video signal SEL is invariable during the predetermined time interval when the first digital video signal FV is selected by the video switch 251.

When each of the bits $X_1$, $X_2$, and $X_3$ takes the logic "1" level during a single horizontal scanning time interval, each of first, second, and third output signal $F_1$, $F_2$, and $F_3$ of the flip flops 257, 258, and 259 becomes the logic "1" level. Each output signal $F_1$, $F_2$, and $F_3$ is reset at every horizontal scanning period. Responsive to the output signals $F_1$, $F_2$, and $F_3$, a detector 262 detects the selected uniform quantization characteristic to produce the first mode signal Ma at an end of the predetermined time interval. Specifically, when the first output signal $F_1$ takes the logic "1" level, the selected digital signal in question is regarded as being quantized by the uniform quantization charactristic of 8 bits in the detector 262. Likewise, the uniform quantization characteristics of 7 and 6 bits can be detected when the second and the third output signals $F_2$ and $F_3$ take the logic "1" level. The logic "0" levels in all of the first through the third output signals $F_1$ to $F_3$ specify the uniform quantization characteristic of 5 bits. Thus, the first mode signal Ma specifies each of the preliminarily processed characteristics, namely, the uniform quantization characteristics.

The mode selector 256 further comprises a delay circuit 264 for delaying the selected video signal SEL during one horizontal scanning time interval to produce delayed video signals DSS. The delay circuit 264 serves to synchronize the first mode signal Ma with the delayed video signals DSS. Thus, it is possible to detect the mode of operation in the first encoder 51 or the first decoder 52 from three of the less significant bits.

In FIG. 21, the mode signal Ma is supplied from the mode selector 256 to the controller 72′. The controller 72′ controls the quantizer 55′ and the variable length encoders 71′ with reference to the amount signal AM and the mode signal Ma. When the video switch 251 is switched, the controller 72′ detects, from the amount signal AM, an amount of information stored in the buffer circuit 74′ to produce a second mode signal (not shown in FIG. 21) corresponding to the inner control signal CTL illustrated in FIG. 1. When overflow or underflow is likely to take place in the buffer circuit 74′, the quantizer 55′ and the variable length encoder 71′ are controlled by the second mode signal and, otherwise, they are operated in accordance with the first mode signal Ma.

Under these circumstances, the second encoder 255 encodes the selected video signal sequence SEL into a sequence of second transmission variable length codes in a manner described in conjunction with FIG. 1. The second code sequence corresponds to a combination of the first digital video signals FV and the second digital signals SV and may be called pre-editing or input edition code sequence. A transmission control signal is produced from the second encoder 255 as a second mode signal representative of that mode of operation which is determined by the amount of information stored in the buffer circuit 74′ and the first mode signal Ma.

Referring back to FIG. 20, the second code sequence is supplied through a second digital memory, namely, a digital video tape recorder 266 to a second decoder 267 similar in structure and operation to the first decoder 52. At any rate, the second decoder 267 produces second decoded digital video signals representative of reproductions of the second transmission variable length codes. The second decoded digital video signals are supplied as edited digital video signals EV to a digital-to-analog converter 268 and are converted into reproduced analog video signals RA to be displayed as a picture or pictures.

As mentioned above, the second encoder 255 serves to encode a pair of digital video signals to produce a pre-editing, namely, preparatory variable length codes and the second decoder 267 serves to edit the pre-editing variable length codes into the edited digital video signals. The transmission rate of each variable length code supplied from the first and the second encoders 51 and 255 may be different from a bit rate of each decoded digital video signal supplied from the first and the second decoders 52 and 267.

Thus, the system illustrated in FIG. 20 can edit uncompressed digital video signals together with compressed digital video signals.

Figure 23:
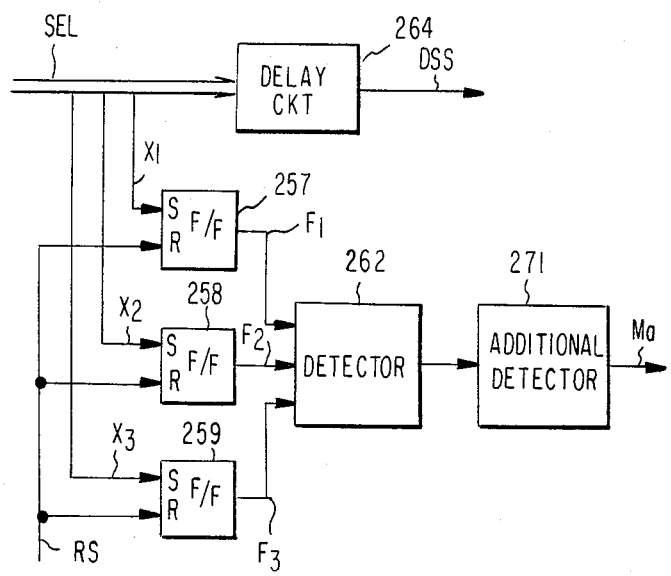
FIG. 23 shows a block diagram of another mode selector applicable to the illustrated encoder.

Referring to FIG. 23, a mode selector 256 is for use in the second encoder 255 illustrated in FIG. 21 and is similar in structure to that shown in FIG. 22 except that the illustrated mode selector 256 comprises an additional detector 271. The additional detector 271 stores a predetermined number of mode signals each of which is sent from the detector 262 at every horizontal scanning period. Thereafter, detection of a mode is made from the predetermined number of the mode signals.

The additional detector 271 serves to distinguish the decoded digital signals from the second or original digital signals. The additional detector 271 carries out such detection, taking the following into consideration. At first, each bit number of the decoded digital signals is changed from eight bits to the other with time. Second, the least significant bits of the original digital signal are changed at random and each horizontal line is regarded as a mode of eight bits. As a result, the eight bit mode continuously appears when the original digital signals are sent to the mode selector 271 as the selected digital signals SEL. For example, the additional detector 271 monitors the mode signals equal in number to thirty-two to produce the first mode signal Ma with reference to the result of monitoring.

Figure 24:
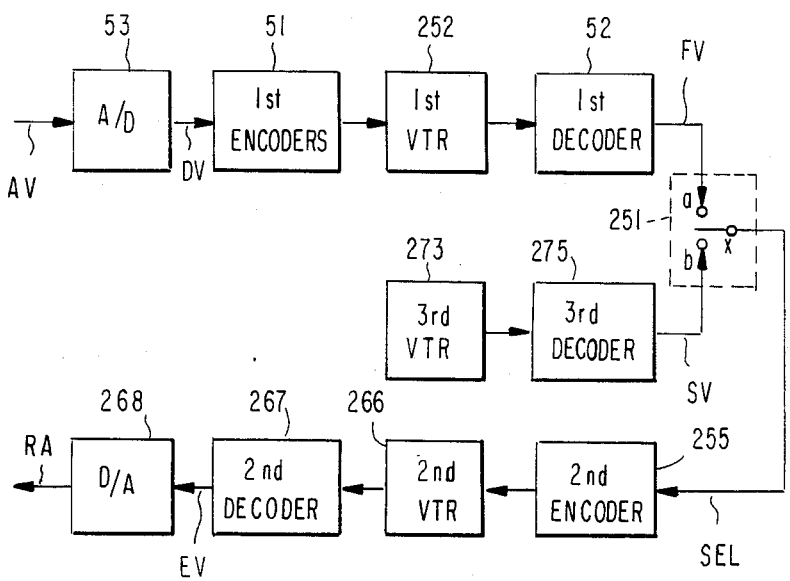
FIG. 24 shows a block diagram of an editing system according to a seventh embodiment of this invention.

Referring to FIG. 24, an editing system according to a seventh embodiment of this invention is similar to that illustrated with references to FIG. 20 except that the second digital video signals SV are supplied to the video switch 251 from a third digital video tape recorder 273 through a third decoder 275. Let the third digital video tape recorder 273 record a sequence of variable length codes or compressed codes encoded by the use of a preutilized encoder of a non-recursive type (not shown) similar to the first encoder 51. The recorded variable length codes are subjected to preliminary quantization and are dependent on quantization characteristics of the preutilized encoder. This means that the recorded variable length codes result from preliminary processed digital video signals. In this case, the third digital video tape recorder may not record a mode signal representative of the quantization characteristics determined by an amount of information stored in a buffer circuit of the preutilized encoder, as mentioned in connection with FIG. 20.

The third digital video tape recorder 273 successively supplies the recorded variable length codes to the third decoder 275 similar in structure and operation to each of the first and the second decoders 52 and 267. As a result, the third decoder 275 produces, as the second digital video signals, decoded digital video signals which are reproductions of the preliminary processed digital video signals.

The first and the second digital video signals FV and SV both of which are variable length codes are selected by the video switch 251 and supplied as the selected video signals SEL to the second encoder 255 in a manner described in conjunction with FIG. 20. Herein, it is assumed that each of the first and the second digital video signals FV and SV is produced at the predetermined transmission rate. The second encoder 255 is operated to produce the pre-editing code sequence of the variable code lengths by the use of the first mode signal Ma derived from the selected video signals SEL in a manner described with reference to FIGS. 21 and 22 or FIG. 23.

Figure 25:
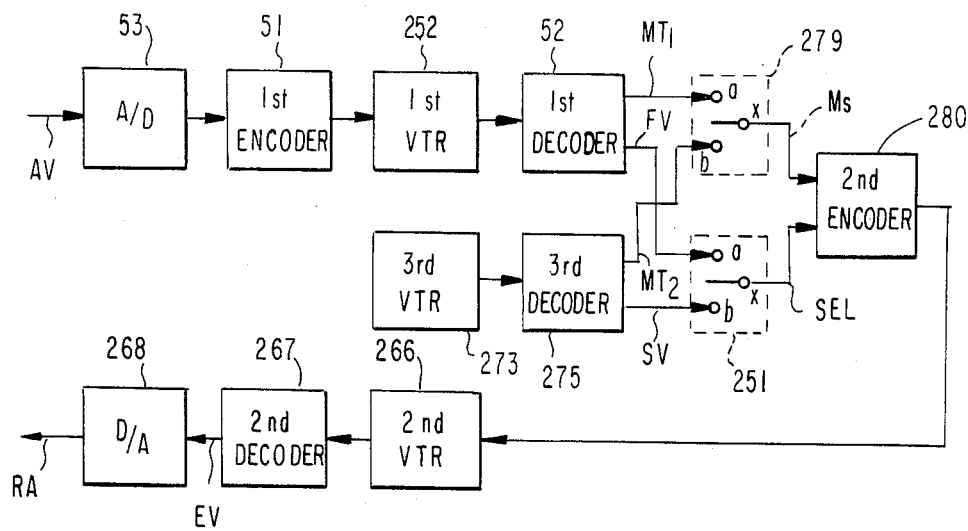
FIG. 25 shows a block diagram of an editing system according to an eighth embodiment of this invention.

Referring to FIG. 25, an editing system according to an eighth embodiment of this invention comprises similar parts designated by like reference numerals. In FIG. 25, the first and the third decoders 52 and 275 produces not only the first and the second video signals FV and SV but also first and second transmission mode signals $MT_1$ and $MT_2$, respectively. The first and the second transmission mode signals $MT_1$ and $MT_2$ define the quantization characteristics of the first and the preutilized encoders, respectively, as mentioned before. Production of such a mode signal is possible by monitoring the variable length codes read out of the buffer circuit 93 of the decoder 52, as shown by a broken line and MT (suffixes omitted) in FIG. 1 or 5. On the other hand, the inner control signal ICT shown in FIG. 1 or 5 may be produced as such a mode signal because each of the quantization characteristics is determined by the amount of information stored in the encoder buffer circuit 74 and the inner control signal ICT can specify each of the quantization characteristics determined by the amount.

A mode switch 279, which has a switching terminal x and first and second terminals a and b, is operated in synchronism with the video switch 251 to select the same terminal a or b as the video switch 251. Thus, the first and the second transmission mode signals $MT_1$ and $MT_2$ are selectively supplied through the mode switch 279 as a selected mode signal Ms to a second encoder 280 as will be described below.

Figure 26:
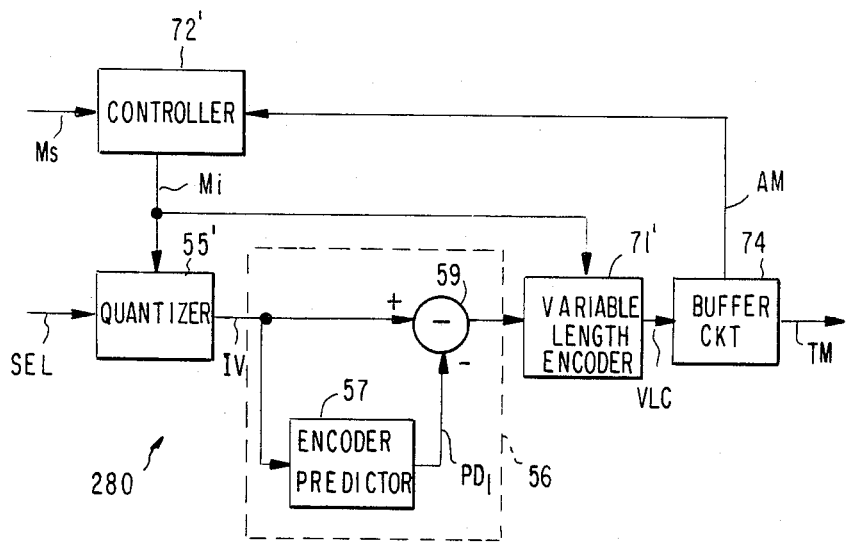
FIG. 26 shows a block diagram of an encoder applicable to the editing system illustrated in FIG. 25.

Referring to FIG. 26, the second encoder 280 is similar to the encoding device 51 illustrated in FIG. 1 except that a controller 72' is supplied with the selected mode signal Ms and that a quantizer 55' has four kinds of quantization characteristics for quantizing eight bits of each digital video signals into 8 bits, 7 bits, 6 bits, or 5 bits. The encoder predictor 57 of the predictive encoder 56 may be operable in accordance with the first predictive function $P_1(z)$ or the second and the third predictive functions $P_2(z)$ and $P_3(z)$. The variable length encoder 71' has $2^8$-kinds of the variable length codes. Selection is made from the variable length codes in a manner described in conjunction with FIG. 4. It should be kept in mind that the variable length encoder 71' has four selectable encoding characteristics for encoding the encoded predictive error signals e into the variable length codes divisible into four sets of 256, 128, 64, and 32. In addition, two kinds of additional encoding characteristics are prepared in the illustrated variable length encoder 71' to encode the encoded predictive error signals e into equal length codes of 5 bits and 8 bits, as will become clear.

Figure 27:
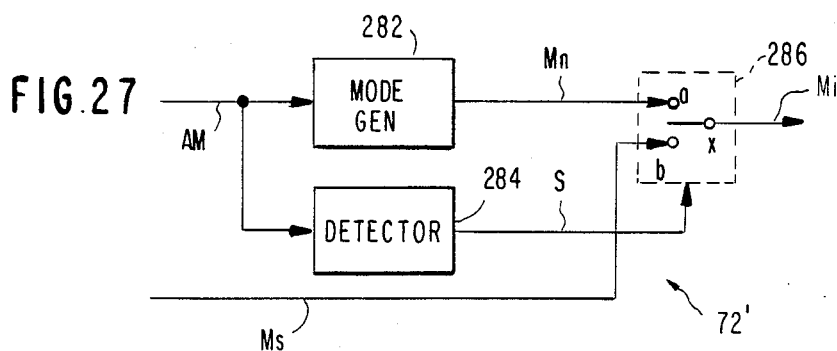
FIG. 27 shows a block diagram of a controller used in the encoder.

Referring to FIG. 27, the illustrated controller 72' is supplied with the amount signal AM and the selected mode signal Ms to produce an internal mode signal Mi similar to the internal control signal CTL. The internal mode signal Mi appears at every horizontal scanning period. The amount signal AM is delivered from the buffer circuit (shown in FIG. 26) to a mode generator 282 and a detector 284. The mode generator 282 is for monitoring the amount of information in response to the amount signal AM to produce an inside mode signal Mn defining an operable mode of the second encoder 72', as will become clear. The detector 284 is for detecting overflow and/or underflow of the buffer circuit 74 with reference to the amount signal AM to switch from the selected mode signal Ms to the inside mode signal Mn by producing a switching signal S.

Figure 28:
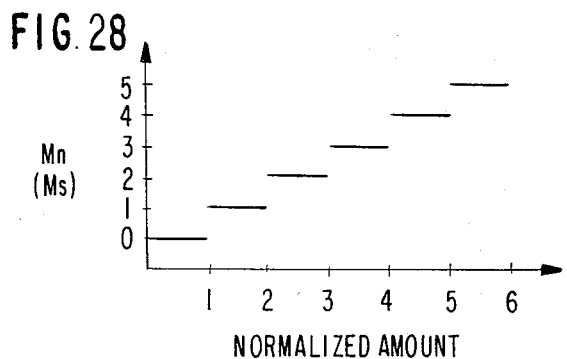
FIG. 28 shows a graphical representation for describing operation of a mode generator used in the controller.

Temporarily referring to FIG. 28, wherein the abscissa is representative of a normalized amount of the buffer circuit 74 divided into six grades and the ordinate, a value represented by the inside mode signal Mn, the inside mode signal Mn becomes zero and indicates an underflow mode when the normalized amount is between 0 and 1 and the amount of information is extremely small in the buffer circuit 74. On the other hand, when the normalized amount is between 5 and 6 and overflow is likely to take place in the buffer circuit 74, the inside mode signal Mn takes the value of 5 which indicates an overflow mode. Likewise, the inside mode signal Mn become the values of 1, 2, 3, and 4 when the normalized amounts are between 1 and 2, between 2 and 3, between 3 and 4, and between 4 and 5, respectively. The values of 1, 2, 3, and 4 of the inside mode signals Mn do not make sense in the controller 72' illustrated in FIG. 27, as will become clear presently.

Figure 29:
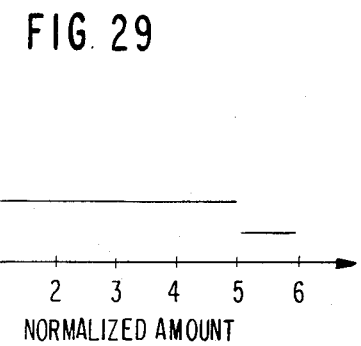
FIG. 29 shows a graph for describing operation of a detector illustrated in FIG. 27.

Referring to FIG. 29 for a while, the switching signal S produced from the detector 284 takes the logic "0" level when the normalized amount is less than 1 and more than 5 and, otherwise, the switching signal S takes the logic "1" level.

Turning to FIG. 27, the inside mode signal Mn and the selected mode signal Ms are given to a switching circuit 286 responsive to the switching signal S. The switching circuit 286 has a switching terminal x and first and second terminals a and b. When the switching signal S takes the logic "0" level, the switching terminal x is connected to the first terminal a. As a result, the inside mode signal Mn is produced as the internal mode signal Mi and represents either the value of 0 or the value of 5. In other words, the inside mode signal Mn appears as the internal mode signal only when the underflow or the overflow is likely to occur in the buffer circuit 74. Herein, operation based on the inside mode signal Mn may be called a first mode.

In the first mode, when the inside mode signal Mn becomes zero, the variable length encoder 71' carries out encoding operation in accordance with one of the additional characteristics for the equal length codes of 8 bits. Simultaneously, the quantizer 55' is operated in compliance with the quantization characteristic for the quantization of 8 bits. When the inside mode signal Mn takes the value of 5 in the first encoding mode, the variable length encoder 71' is put into operation in accordance with the other additional encoding characteristic for the equal length codes of 5 bits. Concurrently, the quantizer 55' is operated in compliance with the quantization characteristic for quantization of 5 bits. If the transmission rate or bit rate is higher than 5 bits/-pixel, the overflow of the buffer circuit 74 is avoidable.

In FIG. 27, when the selected mode signal Ms is produced as the internal mode signal Mi through the switching circuit 286, the second encoder 280 is put into operation in accordance with the selected or outside mode signal Ms. This mode may be called a second mode. In the second mode, the quantizer 55' and the variable length encoder 71' carries out quantization and encoding operation under control of the selected mode signal Ms.

Figure 30:
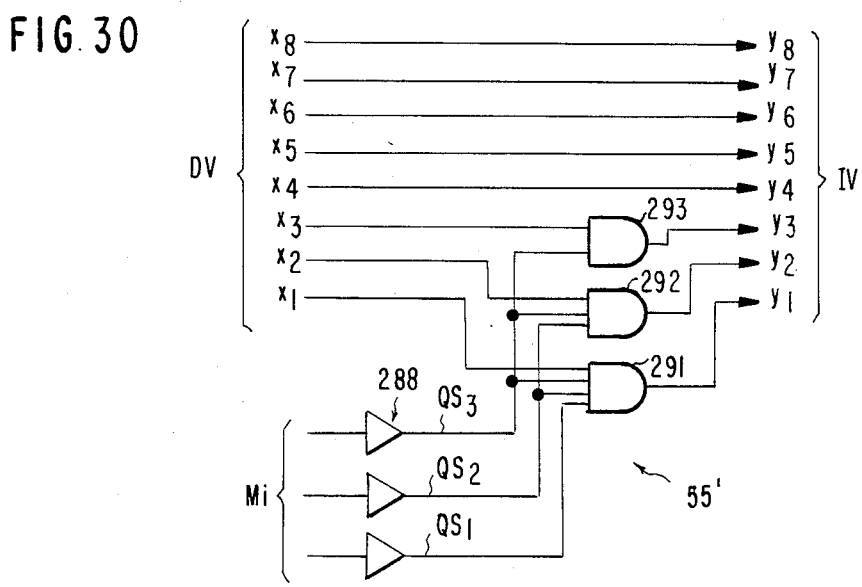
FIG. 30 shows a circuit diagram of a quantizer used in the encoder illustrated in FIG. 26.

Temporarily referring to FIG. 30, the quantizer 55' illustrated in FIG. 26 is supplied with each digital video signal of 8 bits and controlled by first, second, and third bit signals $QS_1$, $QS_2$, and $QS_3$ given by allowing the internal mode signal Mi to pass through inverters (collectively shown by 288). First, second, and third AND gates 291, 292, and 293 are supplied with three of the less significant bit signals $x_1$, $x_2$, and $x_3$, respectively. The first bit signal $QS_1$ is given to the first AND gate 291 and the second bit signal $QS_2$ is given to the first and the second AND gates 291 and 292. Likewise, the third bit signal $QS_3$ are supplied to the first through the third AND gates 291, 292, and 293. It is readily understood that the quantizer 55' produces a quantized signal of 8, 7, 6, or 5 bits as each preliminary processed digital video signal by selecting a combination of the first through the third bit signals $QS_1$, $QS_2$, and $QS_3$.

Referring back to FIG. 25, the buffer circuit 74 illustrated in FIG. 26 is supplied as the buffer input codes with the variable length codes including the equal length codes. The stored codes are successively sent as the pre-editing variable length codes to the second digital video tape recorder 266 (shown in FIG. 25) at the transmission bit rate, together with the transmission control signal similar to the internal mode signal Mi and/or the internal control signal CTL illustrated in FIG. 1. The pre-editing variable length codes are supplied through the second digital video tape recorder 266 and the second decoder 267 to the digital-to-analog converter 268 to be converted into the reproduced analog signals RA.

Figure 31:
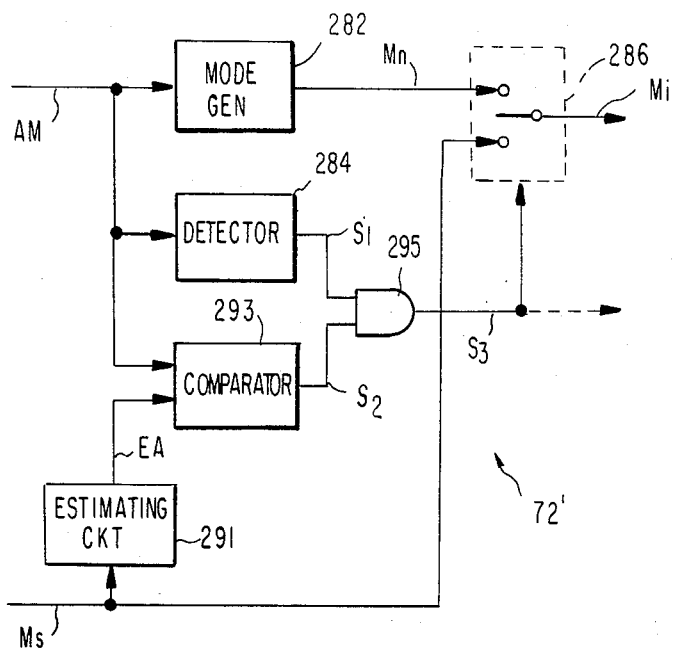
FIG. 31 shows a block diagram of a modified controller applicable to the encoder illustrated in FIG. 26.

Referring to FIG. 31, a modified controller 72' which is available to the second encoder 280 illustrated in FIG. 26 is similar to that illustrated in FIG. 27 except that an estimating circuit 291 and a comparator 293 are attached to the controller illustrated in FIG. 26 together with an AND gate 295. In this case, the detector 284 supplies the switching signal as a first switching signal $S_1$ to the AND gate 295. The selected mode signal Ms is delivered to the estimating circuit 291 and to the switching circuit 286. Responsive to the selected mode signal Ms, the estimating circuit 291 estimates an amount of information stored in the selected decoder 52 or 275 with reference to the selected mode signal Ms to produce an estimated amount signal EA responsive of the estimated amount. Such estimation is readily possible because the selected mode signal Ms is similar to the inner control signal ICT (in FIG. 1) dependent on the amount of information stored in the buffer circuit 74, as suggested in FIG. 28. For example, if the selected mode signal Ms is representative of the value of 3, the estimated amount is estimated at a center value, namely, 3.5 of an amount specified by the selected mode signal Ms.

Supplied with the amount signal AM and the estimated amount signal EA, the comparator 293 compares the amount (namely, encoder information amount) in the second encoder 280 with the estimated amount to produce a second switching signal $S_2$. The second switching signal $S_2$ takes the logic "0" level when a difference of the encoder information amount and the estimated amount exceeds the normalized amount (shown in FIG. 28) of, for example, 2. The logic "0" level continuously produced until the difference is less than the normalized amount of, for example, 1. Otherwise, the second switching signal $S_2$ takes the logic "1" level. This means that the logic "0" level of the second switching signal $S_2$ is representative of the fact that the difference of information amounts is large.

On the other hand, the first switching signal $S_1$ takes the logic "0" level when the normalized amount is between 0 and 1 and between 5 and 6, as described with reference to FIG. 28.

From this fact, it is readily understood that the AND gate 285 produces a third switching signal $S_3$ of the logic "0" level while the second switching signal $S_2$ takes the logic "1" level and that the inside mode signal Mn is delivered as the internal mode signal Mi to the quantizer 55' and the variable length encoder 71'. In other words, the second encoder 280 is operated in the first made.

Referring to FIG. 28 again, the mode generator 282 can produce the inside mode signal Mn representative of the values of 1, 2, 3, and 4, when the normalized amounts are between 1 and 2; 2 and 3; 3 and 4; and 4 and 5, respectively, as mentioned before. In the quantizer 55' illustrated in FIG. 30, operation is carried out in accordance with the quantization characteristics for 8 bits; 7 bits; 6 bits; and 5 bits when the values of the inside mode signal Mn produced as the internal mode signal Mi take 0 and 1; 2; 3; and 4 and 5, respectively.

Thus, the controller 31 is operable in the first mode determined by the second encoder 280 itself. Accordingly, the second encoder 280 encodes the original digital video signals as shown by SV in FIG. 20 into the variable length codes when the third switching signal $S_3$ of the controller 72' keeps the logic "0" level on supply of the original digital video signals to the second encoder 280.

Figure 32:
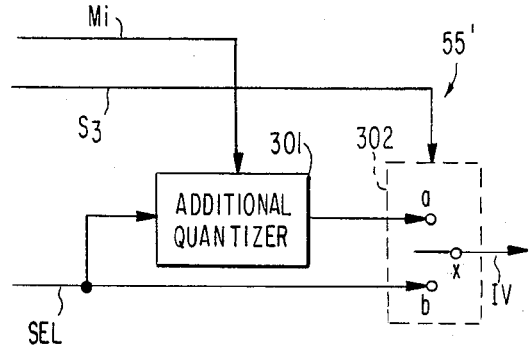
FIG. 32 shows a block diagram of a quantizer applicable to the encoder illustrated in FIG. 26.

Referring to FIG. 32, a modified quantizer 55' is applicable to the second encoder 280 shown in FIG. 26 and is for use in combination with the controller 72 illustrated in FIG. 31 and operable in response to the internal mode signal Mi and the third control signal $S_3$ (as suggested by a broken line in FIG. 31). The modified quantizer 55' comprises an additional quantizer 301 operable in response to the internal mode signal Mi. The additional quantizer 301 is similar to the quantizer 55' itself and has four quantization characteristics. The selected video signals SEL are supplied to the additional quantizer 301 to be quantized into quantized video signals QV in accordance with one of the quantization characteristics that is selected by the internal mode signal Mi. The quantized video signals QV and the selected video signals SEL are given to a video switch 302 responsive to the third switching signal $S_3$.

Only when the third switching signal $S_3$ takes the logic "0" level, the quantized video signals QV appear as the preliminary processed digital video signals IV through the video switch 302. Otherwise, the selected video signals SEL are produced as the preliminary processed digital video signals as they are. Hence, the additional quantizer 301 carries out quantization of the selected video signals SEL in the first mode.

At any rate, the second encoder 280 illustrated in FIG. 26 can avoid overflow and underflow in the buffer circuit 74 therein by switching from the second mode to the first mode.

Figure 33:
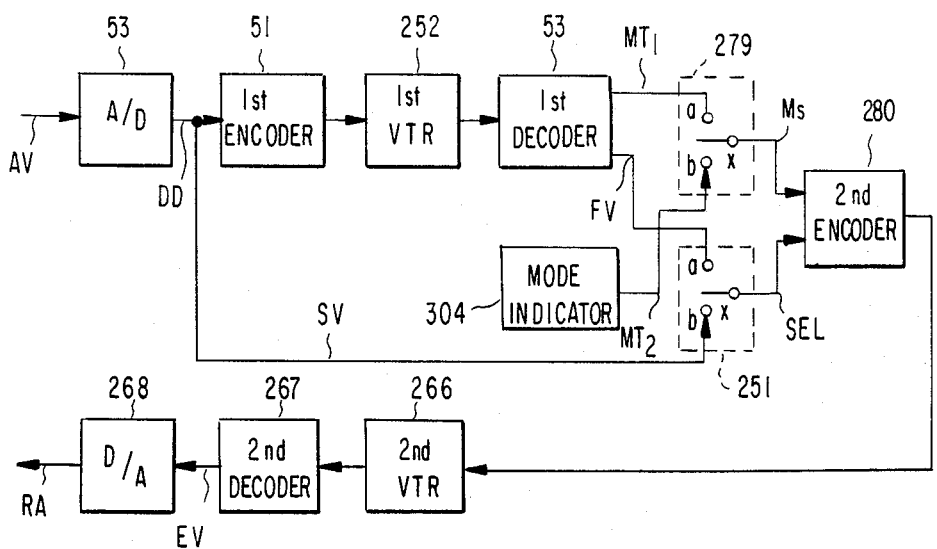
FIG. 33 shows a block diagram of an editing system according to a ninth embodiment of this invention.

Referring to FIG. 33, an editing system according to a ninth embodiment of this invention is similar to that illustrated in FIG. 25 except that the input digital video signals DV are directly supplied to the video switch 251 as the second digital video signals SV without compression of codes, as is the case with FIG. 20 and that a mode indicator 304 is connected to the mode switch 279. In this case, the second digital video signals SV are given as the original digital video signals to the video switch 251 without accompanying the second transmission mode signal $MT_2$.

Inasmuch as the second encoder 280 cannot encode the selected video signals SEL without any mode signal, the mode indicator 304 produces the second transmission mode signal $MT_2$ representative of a mode of the original video signals, that is, the mode of 8 bits. Therefore, the second transmission mode signal $MT_2$ is sent as the selected mode signal Ms to the second encoder 280 through the mode switch 279 when the second ditigal signals SV are selected by the video switch 251.

With this system also, it is possible to edit a pair of digital video signals to produce edited digital video signals from the second decoder at a predetermined editing rate or bit rate. The editing bit rate is identical with the bit rate of the digital video signal sequence produced from the analog-to-digital converter 53.

In all of the editing systems illustrated in FIGS. 20, 24, 25, and 33, the preliminarily or preparatorily processed digital video signals in the second encoder 255 or 280 are decoded into the second decoded digital video signals in the second decoder 267 with that information carried by the preliminarily or preparatorily processed digital signals which is preserved in the second or edited decoded digital video signals, as long as the preliminary processing circuit 54, such as the quantizer 55, the sub-sampling circuit 130, and/or the band limitation circuit 160, is used in combination with the non-recursive encoder at each of the first and the second encoders.

Practically, the transmission rates of the first and the second encoders 51 and the second encoders 255 or 280 are equal to those of the first and the second digital video tape recorders 252 and 266, respectively. The first and the second digital video signals FV and SV are supplied to the video switch 251 at the same bit rates determined by the sampling frequency and the bit numbers of each sample. Each bit rate is equal to that of the second decoded digital video signals sent from the second decoder 267 to the digital-to-analog converter 268. It is needless to say that the above-mentioned transmission rates are different from the bit rates because the transmission variable length codes are subjected to code compression as compared with the decoded digital video signals.

Each editing system may be available to a dubbing system in which the second digital video signals are given to the second encoder 255 or 280. In this sense, a circuit for the second digital video signals, for example, the third digital video tape recorder 273 and the third decoder 275 may be called an auxiliary circuit and the video switch 251 and/or the mode switch 279 may be called an intermediary circuit for distributing the output signals of the first decoder to the second encoder 255 or 280 as second encoder input or coding digital video signals.

While this invention has thus far been described in conjunction with various kinds of embodiments thereof, it is readily possible for those skilled in the art to put this invention into practice in various manners. For example, only the band compression circuit shown in FIG. 15 may be used as the preliminary processing circuit 54. Various predictive functions may be used in each predictor of the non-recursive encoders. Interpolation may be also carried out in compliance with different transfer functions. A wide variety of encoding characteristics may be applicable to each encoding device to encode the predictive error signals into the variable length codes. A runlength encoding, a bit plane encoding, a level plane encoding, or a block encoding method is practicable as a method for producing the variable length codes. Each code communication system illustrated with reference to FIGS. 5, 10, 14, and 16 may be available to each encoder and each decoder of the editing systems illustrated in FIGS. 20, 24, 25 and 33. The NTSC color television signals may be substituted for PAL color television signals.

What is claimed is:

1. An encoding system for encoding input digital video signals to produce transmission variable length codes at a predetermined rate, said encoding system comprising:

buffer means for storing buffer input codes to produce the stored input codes as said transmission variable length codes at said predetermined rate and to additionally produce an amount signal representative of an instantaneous amount of the stored input codes, said buffer means producing said transmission variable length codes together with a transmission control signal representative of said instantaneous amount;

control means responsive to said amount signal for producing an internal control signal representative of said instantaneous amount;

preliminary processing means responsive to said internal control signal for preliminarily processing said input digital video signals in consideration of said instantaneous amount to produce preliminarily processed digital video signals;

predictive encoding means for predictively encoding said preliminarily processed digital video signals in accordance with a predetermined encoding rule to produce encoded error signals, said predetermined encoding rule being reversible to a decoding rule which is for use in decoding reproductions of said encoded error signals to produce reproductions of said preliminarily processed digital video signals;

variable length encoding means having a plurality of selectable encoding characteristics and being responsive to said internal control signal for further encoding said encoded error signals to produce preliminary variable length codes in compliance with one of said selectable encoding characteristics that is selected as a selected encoding characteristic in consideration of said instantaneous amount at each instant, said selectable encoding characteristics defining different code lengths, respectively, said preliminary variable length codes thereby being possessed of variable code lengths which are defined from time to time by said selected encoding characteristic; and signal supplying means for supplying said preliminary variable length codes to said buffer means as said buffer input codes, respectively.

2. An encoding system as claimed in claim 1, wherein said preliminary processing means comprises quantizing means having a plurality of selectable quantizing characteristics and being responsive to said internal control signal for quantizing said input digital video signals to produce said preliminarily processed signals in compliance with one of said selectable quantizing characteristics that is selected in consideration of said instantaneous amount at each instant, said selectable quantizing characteristics defining different quantization steps, said preliminary processed digital video signals being possessed of variable quantization steps which are defined from time to time by said selected quantization characteristic.

3. An encoding system as claimed in claim 1, wherein said preliminary processing means comprises:

designation pulse producing means responsive to said internal control signal for producing designation pulses in consideration of said instantaneous amount at each instant, production of said designation pulses thereby being timed by said input digital video signals; and sub-sampling means responsive to said designation pulses for sub-sampling said input digital video signals by deleting those of said input digital video signals therefrom which are timed by said designation pulses as designated digital video signals, said sub-sampling means thereby producing those of said input digital video signals as said preliminarily processed digital video signals which remain after said designated digital video signals are deleted from said input digital video signals.

4. An encoding system as claimed in claim 1, wherein: said preliminary processing means comprises:

designation pulse producing means responsive to said internal control signal for producing designation pulses in consideration of said instantaneous amount at each instant, production of said designation pulses thereby being timed by said input digital video signals;

sub-sampling means responsive to said designation pulses for sub-sampling said input digital video signals by deleting those of said input digital video signals therefrom which are timed by said designation pulses as designated video signals, said sub-sampling means thereby producing those of said input digital video signals as remaining digital video signals which remain after deletion of said designated digital video signals;

estimating means responsive to said input digital video signals for estimating each of said input digital video signals in a predetermined manner from those of said input digital video signals, each of which is in a predetermined relationship to said each of said input digital video signals, said estimating means thereby producing estimated digital video signals which are estimated for the responsive input digital video signals; and means coupled to said sub-sampling means and said estimating means and being responsive to said designation pulses for producing, as said preliminarily processed digital video signals, said remaining digital video signals and those of said estimated digital video signals which are estimated for said designated digital video signals, respectively, as specific digital video signals, with said specific digital video signals substituted for the respective designated digital video signals;

said predictive encoding means thereby producing, as said encoded error signals, particular and specific error signals by predictively encoding said remaining and said specific digital video signals, respectively, in accordance with said predetermined encoding rule;

said variable length encoding means comprising:

means responsive to said encoded error signals and said designation pulses for deleting said specific error signals from said encoded error signals to produce only said particular error signals; and means having said selectable encoding characteristics and responsive to said internal control signal for encoding only said particular error signals in accordance with said selected encoding characteristic to produce said preliminary variable length codes.

5. A decoding system for use in combination with the encoding system of claim 1 to be responsive to said transmission variable length codes accompanied by said transmission control signal to produce said reproductions of said preliminarily processed digital video signals, said decoding system comprising:

variable length decoding means having a plurality of selectable decoding characteristics and being responsive to said transmission control signal for decoding said transmission variable length codes to produce said reproductions of encoded error signals in accordance with one of said selectable decoding characteristics that is selected in consideration of said instantaneous amount at each instant, said selectable decoding characteristics corresponding to said selectable encoding characteristics, respectively; and predictive decoding means for predictively decoding said reproductions of encoded error signals in accordance with said decoding rule to produce said reproductions of preliminarily processed digital video signals.

6. An encoding system as claimed in claim 1, wherein said preliminary processing means comprises:

a combination of at least two preselected circuits preselected from first, second, and third circuits, each of said preselected circuit being responsive to input signals and said internal control signal for producing output signals, one of said preselected circuits being in cascade connection to another thereof, a predetermined one and another predetermined one of said preselected circuits being first-stage and last-stage circuits in the cascade connection, respectively, said first-stage circuit being supplied with said input digital video signals as the input signals thereof, said last-stage circuit producing the output signal thereof as said preliminarily processed digital video signals;

said first circuit comprising a quantizer having a plurality of selectable quantization characteristics and being responsive to said internal control signal for quantizing the input signals thereof to produce quantized digital video signals as the output signals thereof in compliance with one of said selectable quantization characteristics that is selected in consideration of said instantaneous amount at each instant;

said second circuit comprising a thinning circuit having a plurality of selectable thinning characteristics and being responsive to said internal control signal for thinning the input signal thereof to produce those of the input signal thereof which remain after the input signal thereof are thinned in compliance with one of said thinning characteristics that is selected in consideration of said instantaneous amount at each instant;

said third circuit comprising a band limitation circuit having a plurality of selectable band limitation characteristics and being responsive to said internal control signal for band limiting the input signals thereof to produce the output signals thereof in compliance with one of said selectable band limitation characteristics that is selected in consideration of said instantaneous amount at each instant.

7. An encoding system as claimed in claims 1 or 6, said predictive encoding means producing said encoded error signals as first encoded error signals, respectively; wherein:

said control means is for producing said internal control signal as a first control signal only when said instantaneous amount is less than a preselected threshold amount and for additionally producing a second control signal when said instantaneous amount is not less than said threshold amount;

said encoding system further comprising additional predictive encoding means responsive to said second control signal for directly predictively encoding said input digital video signals in accordance with a nonuniform predictive encoding rule to produce second encoded error signals;

said variable length encoding means comprising:
a first variable length encoder section;
a second variable length encoder section; and delivering means responsive to said first control signal for delivering said first encoded error signals to said first variable length encoder section, said delivering means being furthermore responsive to said second control signal for delivering said second encoded error signals to said second variable length encoder section;

said first variable length encoder section having said selectable encoding characteristics and being responsive to said first control signal for further encoding said first encoded error signals in compliance with one of said selectable encoding characteristics that is selected at each instant in consideration of the instantaneous amount represented by said first control signal, said first variable length encoder section thereby producing first variable length codes as those respective ones of said preliminary variable length codes which are produced only when said control means produces said first control signal;

said second variable length encoder section having a plurality of additional encoding characteristics and responsive to said second control signal for further encoding said second encoded error signals in compliance with one of said additional encoding characteristics that is selected at each instant in consideration of the instantaneous amount represented by said second control signal, said second variable length encoder section thereby producing second variable length codes as those respective ones of said preliminary variable length codes which are produced only when said control means produces said second control signal.

8. An encoding system as claimed in claim 1, each of said input digital signal having an input frequency in a predetermined frequency band, wherein said preliminary processing means comprises band limiting means having a plurality of selectable band limiting characteristics and being responsive to said internal control signal for band limiting said input digital video signals to produce said preliminarily processed digital video signals in compliance with one of said selectable band limiting characteristics that is selected as a selected band limiting characteristic in consideration of said instantaneous amount at each instant.

9. An encoding system as claimed in claim 8, wherein said band limiting means comprises a digital filter having a plurality of selectable transfer functions and being responsive to said input digital video signals and said internal control signal for producing said preliminarily processed digital video signals in compliance with one of said selectable transfer functions that is selected as a selected transfer functions in consideration of said instantaneous amount at each instant.

10. An encoding system as claimed in claim 9, wherein said input frequency is a time axial frequency.

11. An encoding system as claimed in claim 9, wherein said input frequency is a spatial frequency.

12. An encoding system as claimed in claim 11, said input digital video signals being space sequentially representative of picture elements of a picture, respectively, said picture being for transmission by said transmission variable length codes, said picture elements being equally spaced along each of equally spaced parallel lines, wherein:

said preliminary processing means further comprises designation pulse producing means responsive to said internal control signal for producing designation pulses in consideration of said instantaneous amount at each instant, production of said designation pulses thereby being timed by said input digital video signals;

said digital filter being responsive additionally to said designation pulses for producing, as said preliminarily processed digital video signals, first filtered digital video signals in response to designated digital video signals and in compliance with said selected transfer function and second filtered digital video signals in response to remaining digital video signals and in compliance with said selected transfer function, each of said designated digital video signals and each of said remaining digital video signals being timed by one of and none of said designation pulses, respectively.

13. An editing system for editing a sequence of transmission digital video signals and a sequence of transmission variable length codes accompanied by a transmission control signal to produce a sequence of edited digital video signals;

said transmission digital variable length codes being produced at a predetermined rate, together with said transmission control signal, by a transmission encoding system in response to said transmission digital video signals, said transmission encoding system comprising:

transmission buffer means for storing transmission buffer input codes to produce the stored transmission buffer input codes as said transmission variable length codes at said predetermined rate and to additionally produce a primary amount signal representative of a primary instantaneous amount of the stored transmission buffer input codes, said transmission buffer means producing said transmission variable length codes together with said transmission control signal which is representative of said primary instantaneous amount;

transmission control means responsive to said primary amount signal for producing a primary internal control signal representative of said primary instantaneous amount;

transmission preliminary processing means responsive to said primary internal control signal for preliminarily processing said transmission digital video signals in consideration of said primary instantaneous amount to produce preliminarily processed digital video signals;

transmission predictive encoding means for predictively encoding said preliminarily processed digital video signals in accordance with a predetermined transmission encoding rule to produce transmission encoded error signals, said predetermined transmission encoding rule being reversible to a transmission decoding rule which is for use in decoding reproductions of said transmission encoded error signals to produce reproductions of said preliminarily processed digital video signals;

transmission variable length encoding means having a plurality of selectable transmission encoding characteristics and being responsive to said primary internal control signal for further encoding said transmission encoded error signals to produce transmission preliminary variable length codes in compliance with one of said selectable transmission encoding characteristics that is selected in consideration of said primary instantaneous amount at each instant; and transmission signal supplying means for supplying said transmission preliminary variable length codes to said transmission buffer system as said transmission buffer input codes, respectively;

said editing means comprising;

a transmission decoding system responsive to said transmission variable length codes accompanied by said transmission control signal for producing said reproductions of preliminarily processed digital video signals, said transmission decoding means comprising:

transmission variable length decoding means having a plurality of selectable transmission decoding characteristics and being responsive to said primary control signal for decoding said transmission variable length codes to produce said reproductions of transmission encoded error signals in compliance with one of said selectable transmission decoding characteristics that is selected in consideration of said primary instantaneous amount at each instant, said selectable transmission decoding characteristics corresponding to said selectable transmission encoding characteristics, respectively; and transmission predictive decoding means for predictively decoding said reproductions of transmission encoded error signals in accordance with said transmission decoding rule to produce said reproductions of preliminarily processed digital video signals as a sequence;

an edition encoding system for encoding input edition digital video signals to produce edition variable length codes at said predetermined rate, said edition encoding system comprising:

edition buffer means for storing edition buffer input codes to produce the stored edition buffer input codes as said edition variable length codes at said predetermined rate and to additionally produce a secondary amount signal representative of a secondary instantaneous amount of the stored edition buffer input codes, said edition buffer means producing said edition variable length codes together with said edition control signal which is representative of said secondary instantaneous amount;

edition control means responsive to said secondary amount signal for producing a secondary internal control signal representative of said secondary instantaneous amount;

edition preliminary processing means responsive to said secondary internal control signal for preliminarily processing said edition input digital video signals in consideration of said secondary instantaneous amount to produce preparatorily processed digital video signals;

edition predictive encoding means for predictively encoding said preparatorily processed digital video signals in accordance with a predetermined edition encoding rule to produce edition encoded error signals, said predetermined edition encoding rule being reversible to an edition decoding rule which is for use in decoding reproductions of said edition encoded error signals to produce reproductions of said preparatorily processed digital video signals;

edition variable length encoding means having a plurality of selectable edition encoding characteristics and being responsive to said secondary internal control signal for further encoding said edition encoded error signals to produce edition preliminary variable length codes in compliance with one of said selectable edition encoding characteristics that is selected in consideration of said secondary instantaneous amount; and edition signal supplying means for supplying said edition preliminary variable length codes to said edition buffer means as said edition buffer input codes, respectively;

switching means for selectively supplying a selected one of said sequence of reproductions of preliminarily processed digital video signals and said sequence of transmission digital video signals to said edition encoding system as said input edition digital video signals; and an edition decoding system for decoding said edition variable length codes accompanied by said secondary control signal to produce said edited digital video signals, said edition decoding means comprising:

edition variable length decoding means having a plurality of selectable edition decoding characteristics and being responsive to said edition control signal for decoding said edition variable length codes to produce said reproductions of edition encoded error signals in compliance with one of said selectable edition decoding characteristics that is selected in consideration of said secondary instantaneous amount at each instant, said selectable edition decoding characteristics corresponding to said selectable edition encoding characteristics, respectively; and edition predictive decoding means for predictively decoding said reproductions of edition encoded error signals in accordance with said edition decoding rule to produce reproductions of said preparatorily processed digital video signals as said edited digital video signals, respectively.

14. An editing system for editing a first and a second sequence of transmission variable length codes accompanied by a first and a second transmission control signal, respectively, to produce a sequence of edited digital video signals;

said first sequence of transmission variable length codes being produced at a predetermined rate, together with said first transmission control signal, by a first encoding system in response to a first sequence of input digital video signals, said first encoding system comprising:

first buffer means for storing first buffer input codes to produce the stored first buffer input codes as said first sequence of transmission variable length codes at said predetermined rate and to additionally produce a first amount signal representative of a first instantaneous amount of the stored first buffer input codes, said first buffer means producing said first sequence of transmission variable length codes together with said first transmission control signal which is representative of said first instantaneous amount;

first control means responsive to said first amount signal for producing a first internal control signal representative of said first instantaneous amount;

first preliminary processing means responsive to said first internal control signal for preliminarily processing said first sequence of input digital video signals in consideration of said first instantaneous amount to produce preliminarily processed first digital video signals;

first predictive encoding means for predictively encoding said preliminarily processed first digital video signals in accordance with a first predetermined encoding rule to produce first encoded error signals, said first predetermined encoding rule being reversible to a first decoding rule which is for use in decoding reproductions of said first encoded error signals to produce reproductions of said preliminarily processed first digital video signals;

first variable length encoding means having a plurality of first selectable encoding characteristics and being responsive to said first internal control signal for further encoding said first encoded error signals to produce first preliminary variable length codes in compliance with one of said first selectable encoding characteristics that is selected in consideration of said first instantaneous amount at each instant; and first signal supplying means for supplying said first preliminary variable length codes to said first buffer means as said first buffer input codes, respectively;

said second sequence of transmission variable length codes being reproduced at said predetermined rate, together with said second transmission control signal, from a signal memory in which said second sequence of transmission variable length codes and said second transmission control signal are memorized after produced by a second encoding system in response to a second sequence of input digital video signals, said second encoding system comprising:

second buffer means for storing second buffer input codes to produce the stored second buffer input codes as said second sequence of transmission variable length codes at said predetermined rate and to additionally produce a second amount signal representative of a second instantaneous amount of the stored second buffer input codes, said second buffer means producing means producing said second sequence of transmission variable length codes together with said second transmission control signal which is representative of said second instantaneous amount;

second control means responsive to said second amount signal for producing a second internal control signal representative of said second instantaneous amount;

second preliminary processing means responsive to said second internal control signal for preliminarily processing said second sequence of input digital video signals in consideration of said second instantaneous amount to produce preliminarily processed second digital video signals;

second predictive encoding means for predictively encoding said preliminarily processed second digital video signals in accordance with a second predetermined encoding rule to produce second encoded error signals, said second predetermined encoding rule being reversible to a second decoding rule which is for use in decoding reproductions of said second encoded error signals to produce reproductions of said preliminarily processed second digital video signals;

second variable length encoding means having a plurality of second selectable encoding characteristics and being responsive to said second internal control signal for further encoding said second encoded error signals to produce second preliminary variable length codes in compliance with one of said second selectable encoding characteristics that is selected in consideration of said second instantaneous amount at each instant; and second signal supplying means for supplying said second preliminary variable length codes to said second buffer means as said second buffer input codes, respectively;

said editing system comprising:

a first decoding system responsive to said first transmission variable length codes accompanied by said first transmission control signal for producing said reproductions of preliminarily processed first digital video signals, said first decoding means comprising;

first variable length decoding means having a plurality of first selectable decoding characteristics and being responsive to said first transmission control signal for decoding said first transmission variable length codes to produce said reproductions of first encoded error signals in compliance with one of said first selectable decoding characteristics that is selected in consideration of said first instantaneous amount at each instant, said first selectable decoding characteristics corresponding to said first selectable encoding characteristics, respectively; and first predictive decoding means for predictively decoding said reproductions of first encoded error signals in accordance with said first decoding rule to produce said reproductions of preliminarily processed first digital video signals as a primary sequence;

a second decoding system responsive to said second transmission variable length codes accompanied by said second transmission control signal for producing said reproductions of preliminarily processed second digital video signals, said second decoding means comprising:

second variable length decoding means having a plurality of second selectable decoding characteristics and being responsive to said second transmission control signal for decoding said second transmission variable length codes to produce said reproductions of second encoded error signals in compliance with one of said second selectable decoding characteristics that is selected in consideration of said second instantaneous amount at each instant, said second selectable decoding characteristics corresponding to said second selectable encoding characteristics, respectively; and second predictive decoding means for predictively decoding said second decoded error signals in accordance with said second decoding rule to produce said reproductions of preliminarily processed second digital video signals as a secondary sequence;

an edition encoding system for encoding input edition digital video signals to produce edition variable length codes at said predetermined rate, said edition encoding system comprising:

edition buffer means for storing edition buffer input codes to produce the stored edition buffer input codes as said edition variable length codes at said predetermined rate and to additionally produce an edition amount signal representative of an edition instantaneous amount of the stored edition buffer input codes, said edition buffer means producing said edition variable length codes together with said edition control signal which is representative of said edition instantaneous amount;

edition control means responsive to said edition amount signal for producing an inside control signal representative of said edition instantaneous amount;

edition preliminary processing means responsive to said inside control signal for preliminarily processing said input edition digital video signals in consideration of said edition instantaneous amount to produce preliminarily processed edition digital video signals;

edition predictive encoding means for predictively encoding said preliminarily processed edition digital video signals in accordance with a predetermined edition encoding rule to produce edition encoded error signals, said predetermined edition encoding rule being reversible to an edition decoding rule which is for use in decoding reproductions of said edition encoded error signals to produce said edited digital video signals;

edition variable length encoding means having a plurality of selectable edition encoding characteristics and being responsive to said inside control signal for further encoding said edition encoded error signals to produce preparatory variable length codes in compliance with one of said selectable edition encoding characteristics that is selected in consideration of said edition instantaneous amount at each instant; and edition signal supplying means for supplying said preparatory variable length codes to said edition buffer means as said edition buffer input codes, respectively;

switching means for selectively supplying a selected one of said primary sequence of reproductions of preliminarily processed first digital video signals and said secondary sequence of reproductions of preliminarily processed second digital video signals to said edition preliminary processing means as said input edition digital video signals; and an edition decoding system responsive to said edition variable length codes accompanied by said edition control signal for producing said edited digital video signals, said edition decoding means comprising:

edition variable length decoding means having a plurality of selectable edition decoding characteristics and being responsive to said edition control signal for decoding said edition variable length codes to produce said reproductions of edition encoded error signals in compliance with one of said selectable edition decoding characteristics that is selected in consideration of said edition instantaneous amount at each instant, said selectable edition decoding characteristics corresponding to said selectable edition encoding characteristics, respectively; and edition predictive decoding means for predictively decoding said reproductions of edition encoded error signals in accordance with said edition decoding rule to produce reproductions of said preliminarily processed edition digital video signals as said edited digital video signals, respectively.

15. An editing system comprising first signal producing means for producing first digital video signals, second signal producing means for producing second digital video signals, selecting means coupled to said first and said second signal producing means for selecting either one of said first and said second digital video signals to produce selected video signals, and editing means coupled to said selecting means for editing said selected video signals into edited digital video signals;

each of said first signal producing means and said editing means comprising an encoder for encoding encoder input signals into encoder output signals and a decoder for decoding input signals into decoder output signals;

said each encoder comprising:

buffer means for storing buffer input codes to produce the stored input codes as said encoder output signals and to additionally produce an amount signal representative of an instantaneous amount of the stored input codes, said buffer means producing said encoder output signals together with a transmission control signal representative of said instantaneous amount;

control means responsive to said amount signal for producing an internal control signal representative of said instantaneous amount;

preliminary processing means responsive to said internal control signal and said encoder input signals for preliminarily processing said encoder input signals in consideration of said instantaneous amount to produce preliminarily processed signals;

predictive encoding means for predictively encoding said preliminarily processed signals in accordance with a predetermined encoding rule to produce encoded error signals, said predetermined encoding rule being reversible to a decoding rule which is for use in decoding reproductions of said encoded error signals to produce reproductions of said preliminarily processed signals;

variable length encoding means having a plurality of selectable encoding characteristics and being responsive to said internal control signal for further encoding said encoded error signals to produce variable length codes in compliance with one of said selectable encoding characteristics that is selected as a selected encoding characteristic in consideration of said instantaneous amount at each instant, said selectable encoding characteristics defining different code lengths, respectively, said variable length codes thereby being possessed of variable code lengths which are defined from time to time by said selected encoding characteristic; and signal supplying means for supplying said variable length codes to said buffer means as said buffer input codes, respectively;

said decoder of each of said first signal producing means and said editing means comprising:

variable length decoding means having a plurality of selectable decoding characteristics and being responsive to said transmission control signal and said decoder input signals for decoding said decoder input signals to produce reproductions of the encoded error signals in accordance with one of said selectable decoding characteristics that is selected in consideration of said instantaneous amount at each instant, said selectable decoding characteristics corresponding to said selectable encoding characteristics, respectively; and predictive decoding means for predictively decoding said reproductions of encoded error signals in accordance with said decoding rule to produce reproductions of the preliminarily processed signals as said decoder output signals;

the encoder of said first signal producing means being supplied with the encoder input signals to deliver the encoder output signals to the decoder of the first signal producing means as the decoder input signals;

the decoder of said first signal producing means producing the decoder output signals as said first digital video signals;

the encoder of said editing means being supplied with said selected video signals as the encoder input signals to deliver the encoder output signals as the decoder input signals to the decoder of said editing means;

the decoder of said editing means producing the decoder output signals as said edited digital video signals.

* * * * *

UNITED STATES PATENT AND TRADEMARK OFFICE
CERTIFICATE OF CORRECTION

PATENT NO. : 4,517,596  
DATED : May 14, 1985  
INVENTOR(S) : Nori Suzuki

It is certified that error appears in the above-identified patent and that said Letters Patent is hereby corrected as shown below:

Column 12, line 21, "31 1" should be --1--;

line 44, after "-4", insert --,--.

Column 17, line 40, "decoder" should be --decoded--.

Column 18, line 43, before "third", insert --the--;

line 67, "persence" should be --presence--.

Column 20, line 15, "subsampling" should be --sub-sampling--.

Column 24, line 47, "$k_B$(-" should be --$k_B$(1- --;

line 48, delete "131".

Column 25, line 23, "distributes" should be --distribute--.

Column 28, line 4, "$R_2(z)$" should be --$P_2(z)$--.

Column 28, line 56, after "may" insert --be--.

Column 34, line 23, "DU" should be --DV--.

Column 40, line 23, "responsive" should be --representative--.

Column 40, line 58, delete "made" insert --mode--.

Column 44, line 12, insert --digital-- after "designated".

Column 45, line 12, "circuit" should be --circuits--.

Column 46, line 64, "spcced" should be --spaced--.

UNITED STATES PATENT AND TRADEMARK OFFICE
CERTIFICATE OF CORRECTION

PATENT NO. : 4,517,596
DATED : May 14, 1985
INVENTOR(S) : Nori Suzuki

It is certified that error appears in the above-identified patent and that said Letters Patent is hereby corrected as shown below:

Column 48, line 7, "means" should be --system--.

Column 54, line 37, "the" (3rd occurrence) should be --said--.

Signed and Sealed this

Eleventh Day of February 1986

[SEAL]

Attest:

DONALD J. QUIGG

Attesting Officer   Commissioner of Patents and Trademarks